(12) United States Patent
Kubota et al.

(10) Patent No.: US 9,212,308 B2
(45) Date of Patent: Dec. 15, 2015

(54) LIQUID CRYSTAL COMPOSITION, POLYMER/LIQUID CRYSTAL COMPOSITE, LIQUID CRYSTAL ELEMENT, AND LIQUID CRYSTAL DISPLAY DEVICE

(75) Inventors: Daisuke Kubota, Kanagawa (JP); Sachiko Kawakami, Kanagawa (JP); Makoto Ikenaga, Kanagawa (JP); Takahiro Yamamoto, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 381 days.

(21) Appl. No.: 13/305,777

(22) Filed: Nov. 29, 2011

(65) Prior Publication Data

US 2012/0138853 A1  Jun. 7, 2012

(30) Foreign Application Priority Data

Nov. 30, 2010  (JP) ................................. 2010-266530

(51) Int. Cl.
| | | |
|---|---|---|
| *C09K 19/52* | (2006.01) | |
| *C09K 19/02* | (2006.01) | |
| *C09K 19/20* | (2006.01) | |
| *C09K 19/30* | (2006.01) | |
| *C09K 19/04* | (2006.01) | |

(52) U.S. Cl.
CPC ......... *C09K 19/0275* (2013.01); *C09K 19/2007* (2013.01); *C09K 19/3068* (2013.01); *C09K 2019/0448* (2013.01); *C09K 2019/0481* (2013.01)

(58) Field of Classification Search
CPC ............... C09K 19/52; C09K 19/0275; C09K 19/2007; C09K 19/3068; C09K 2019/0448; C09K 2019/0481
USPC ............... 252/299.01, 299.6, 299.63, 299.64, 252/299.65, 299.66; 428/1.1; 349/86, 182, 349/183
See application file for complete search history.

(56) References Cited

U.S. PATENT DOCUMENTS

| | | | |
|---|---|---|---|
| 5,833,880 A * | 11/1998 | Siemensmeyer et al. | ......................... 252/299.64 |
| 7,576,829 B2 | 8/2009 | Kikuchi et al. | |
| 7,648,647 B2 | 1/2010 | Kikuchi et al. | |
| 7,722,783 B2 | 5/2010 | Haseba et al. | |
| 7,794,621 B2 | 9/2010 | Schott et al. | |
| 7,879,256 B2 * | 2/2011 | Goldfinger et al. | ....... 252/299.67 |
| 7,985,455 B2 * | 7/2011 | Inagaki et al. | .................. 428/1.1 |
| 8,048,496 B2 * | 11/2011 | Itoh et al. | ......................... 428/1.1 |
| 2008/0259254 A1 | 10/2008 | Kikuchi et al. | |
| 2008/0280071 A1 | 11/2008 | Kikuchi et al. | |
| 2009/0135368 A1 | 5/2009 | Haseba et al. | |
| 2009/0267025 A1 | 10/2009 | Schott et al. | |
| 2010/0103366 A1 | 4/2010 | Farrand et al. | |
| 2010/0258763 A1 | 10/2010 | Schott et al. | |
| 2012/0012785 A1 | 1/2012 | Schott et al. | |
| 2013/0105732 A1 * | 5/2013 | Kubota et al. | ............ 252/299.63 |

FOREIGN PATENT DOCUMENTS

| | | |
|---|---|---|
| CN | 101080480 | 11/2007 |
| EP | 1 743 931 A1 | 1/2007 |
| EP | 2 098 583 A2 | 9/2009 |
| JP | 2003-073669 | 3/2003 |
| JP | 2003-327966 | 11/2003 |
| JP | 2008-524347 | 7/2008 |
| JP | 2008-303381 | 12/2008 |
| JP | 2009-144135 | 7/2009 |
| JP | 2010-510256 | 4/2010 |
| KR | 2007-0087610 | 8/2007 |
| KR | 2009-0091312 | 8/2009 |
| WO | WO 2005-090520 A1 | 9/2005 |
| WO | WO 2006/063662 A1 | 6/2006 |
| WO | WO 2008/061606 A1 | 5/2008 |

OTHER PUBLICATIONS

"International Search Report (Application No. PCT/JP2011/077881; PCT14331) Dated Jan. 31, 2012,".
"Written Opinion (Application No. PCT/JP2011/077881; PCT14331) Dated Jan. 31, 2012,".

* cited by examiner

*Primary Examiner* — Geraldina Visconti
(74) *Attorney, Agent, or Firm* — Nixon Peabody LLP; Jeffrey L. Costellia

(57) ABSTRACT

A liquid crystal composition for forming a polymer/liquid crystal composite in which disorder of an orientation state is reduced is provided. The liquid crystal composition includes a liquid crystal material exhibiting a blue phase and a liquid crystalline monomer represented by the following general formula (G1). Note that the liquid crystal composition may include a non-liquid-crystalline monomer and a polymerization initiator. In the general formula (G1), X represents a mesogenic skeleton; and $Y_1$ and $Y_2$ individually represent an alkylene group having a sum of carbon atoms and/or oxygen atoms of 1 to 20. Also in the general formula (G1), the alkylene group and the alkyl group may include a carbonyl group and may have an ether bond. In addition, the carbonyl group and the ether bond may form an ester structure. In the general formula (G1), $Z_1$ and $Z_2$ individually represent an acryloyl group or a methacryloyl group.

18 Claims, 14 Drawing Sheets

Chain Length of Alkylene group:
Sum of Oxygen atoms and/or Carbon atoms

LIQUID CRYSTAL COMPOSITION, POLYMER/LIQUID CRYSTAL COMPOSITE, LIQUID CRYSTAL ELEMENT, AND LIQUID CRYSTAL DISPLAY DEVICE

TECHNICAL FIELD

The present invention relates to a liquid crystal composition that realizes a polymer-stabilized blue phase, a polymer/liquid crystal composite which is obtained by polymer stabilization of the liquid crystal composition, a liquid crystal element, and a liquid crystal display device.

BACKGROUND ART

In recent years, flat panel displays have been put to practical use and have been substituted for conventional displays using cathode-ray tubes. The flat panel displays include liquid crystal display devices which have liquid crystal display elements, EL display devices which have electro-luminescent elements (EL elements), plasma displays, and the like, and they come into competition in the market. At present, liquid crystal display devices establish a position of superiority by overcoming disadvantages and suppressing production cost with use of a variety of techniques.

The above-described liquid crystal display devices, however, are inferior to the other flat panel displays in a response speed of an element (a speed of switching the display). Various techniques for overcoming the disadvantage in a response speed have been proposed so far. A conventional liquid crystal element which employs a driving method of a liquid crystal called a twisted nematic (TN) mode has a response speed of approximately 10 ms, whereas a liquid crystal element which employs an optical compensated bend (OCB) mode or a ferroelectric liquid crystal (FLC) mode has realized an improved response speed of approximately 1 ms.

Another technique which attracts as much attention as these two driving methods of a liquid crystal applies a state called a blue phase to a liquid crystal display element (see Patent Document 1 for example). The blue phase is a liquid crystal phase which appears between a cholesteric phase and an isotropic phase, and has a characteristic of an extremely high response speed. With use of this blue phase, the response time of a liquid crystal display device can be 1 ms or shorter.

It has been reported that although a blue phase has a feature of a narrow temperature range of several Celsius degrees in which the orientation state can be maintained, the temperature range where a blue phase appears can be improved by using a polymer/liquid crystal composite that is obtained by the polymerization of a liquid crystal composition containing a liquid crystal material exhibiting a blue phase and a polymerizable monomer (for example, see Patent Document 2).

REFERENCE

[Patent Document 1] PCT International Publication No. WO2005/090520
[Patent Document 2] Japanese Published Patent Application No. 2003-327966

DISCLOSURE OF INVENTION

However, when the liquid crystal composition containing the liquid crystal material exhibiting a blue phase and a polymerizable monomer is polymerized by polymer stabilization treatment in order to obtain a polymer/liquid crystal composite, it has been confirmed that the orientation state of the blue phase cannot be maintained in some cases. The disorder of the orientation state causes a defect of a liquid crystal element utilizing a polymer-stabilized blue phase of the polymer/liquid crystal composite or a defect of a display panel using the liquid crystal element such as a liquid crystal panel, which leads to reduction in yield or the like. In view of the above problem, an object of one embodiment of the present invention disclosed is to provide a liquid crystal composition with which disorder of an orientation state of a blue phase of a polymer/liquid crystal composite can be reduced. In order to reduce disorder of an orientation state of the blue phase of the polymer/liquid crystal composite, another object is to provide a liquid crystal composition that can be subjected to polymer stabilization treatment in a wider temperature range. By the polymer stabilization treatment, a polymer/liquid crystal composite with a wide blue phase appearance temperature range is obtained. Another object is to provide a liquid crystal element containing a polymer/liquid crystal composite obtained by polymerization of the liquid crystal composition. Another object is to decrease driving voltage of the liquid crystal element. Another object is to provide a liquid crystal display device including a polymer/liquid crystal composite obtained by polymerization of the liquid crystal composition. Another object is to decrease driving voltage of a liquid crystal display device manufactured using the liquid crystal element. Another object is to provide a novel material contained in the liquid crystal composition.

One embodiment of the present invention is a liquid crystal composition including a liquid crystal material exhibiting a blue phase and a liquid crystalline monomer represented by the following general formula (G1). Note that the liquid crystal composition may include a non-liquid-crystalline monomer and a polymerization initiator.

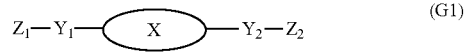

(G1)

In the general formula (G1), X represents a mesogenic skeleton; and $Y_1$ and $Y_2$ individually represent an alkylene group having a sum of carbon atoms and/or oxygen atoms of 1 to 20. The length of the alkylene group is a length that enables the liquid crystallinity to be maintained and does not decrease the compatibility with the liquid crystal material exhibiting a blue phase. The alkylene group may include an alkyl group as a side chain. In addition, the alkylene group and the alkyl group may include a carbonyl group and may have an ether bond. In addition, the carbonyl group and the ether bond may form an ester structure. In the general formula (G1), $Z_1$ and $Z_2$ individually represent an acryloyl group or a methacryloyl group.

Note that in the above structure, $Y_1$ and $Y_2$ in the general formula (G1) individually represent an alkylene group having an odd number of carbon atoms and/or oxygen atoms in total.

Another embodiment of the present invention is a liquid crystal composition containing a liquid crystal material exhibiting a blue phase, a liquid crystalline monomer represented by the following general formula (G1-1), a non-liquid-crystalline monomer, and a polymerization initiator.

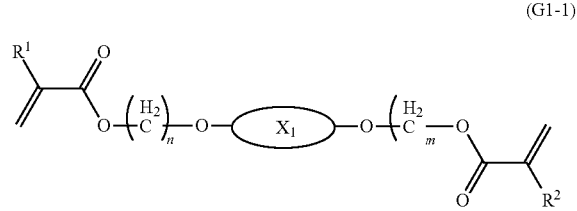

(G1-1)

In the general formula (G1-1), $X_1$ represents a mesogenic skeleton; and $R^1$ and $R^2$ individually represent any one of hydrogen and a methyl group. In the general formula (G1-1), n and m are individually any one of 1 to 19 which enable the liquid crystallinity to be maintained and does not decrease the compatibility with the liquid crystal material exhibiting a blue phase.

Note that in the above structure, $X_1$ in the general formula (G1-1) is represented by any one of the following structural formulae (s11) to (s18).

(s11)
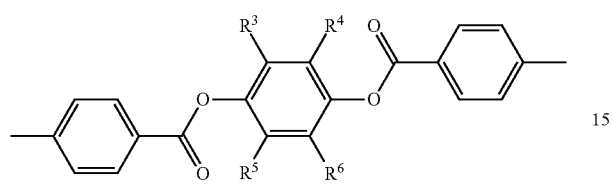

(s12)
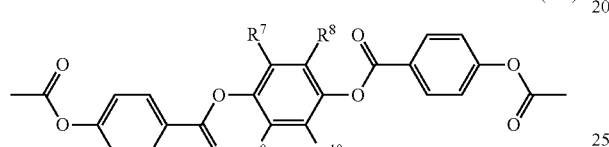

(s13)
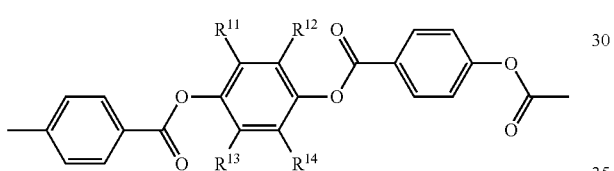

(s14)
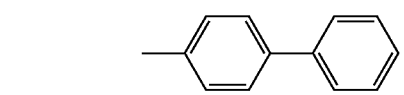

(s15)
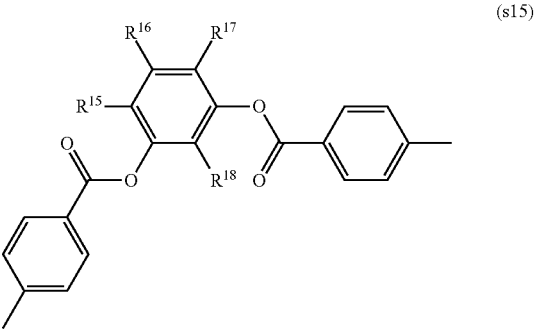

(s16)
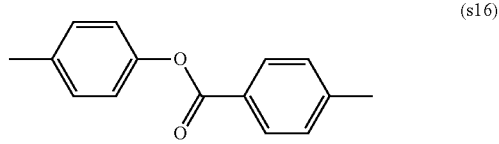

(s17)
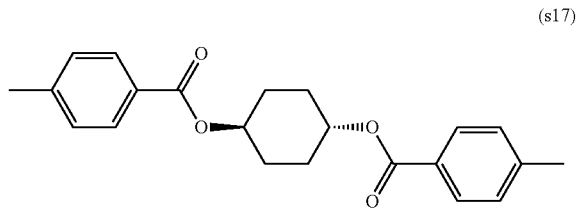

(s18)
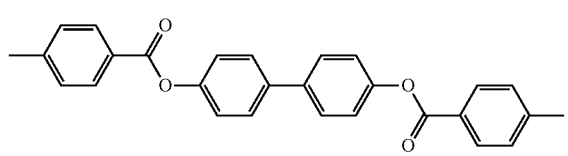

Note that $R^3$ to $R^6$ in the structural formula (s11), $R^7$ to $R^{10}$ in the structural formula (s12), $R^{11}$ to $R^{14}$ in the structural formula (s13), and $R^{15}$ to $R^{18}$ in the structural formula (s15) individually represent any one of hydrogen, a methyl group, and fluorine.

In the above structure, the liquid crystalline monomer represented by the general formula (G1) or the general formula (G1-1) is shown by the following structural formula (104).

(104)
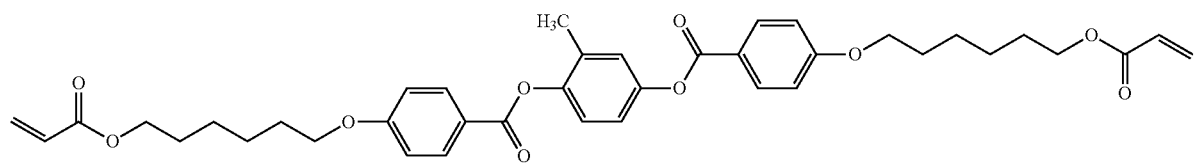

In the above structure, the liquid crystalline monomer represented by the general formula (G1) is shown by the following structural formula (102).

(102)
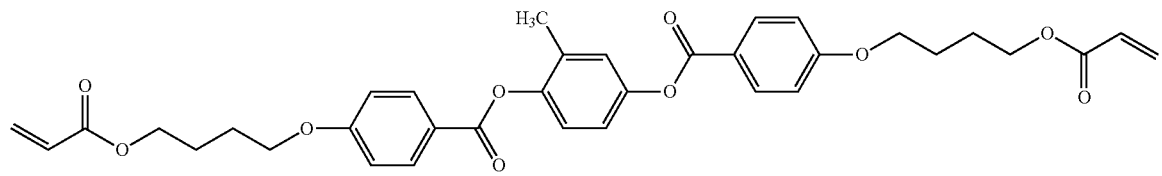

In the liquid crystal composition that is one embodiment of the present invention, the liquid crystalline monomer in the general formula (G1) or the general formula (G1-1) has an alkylene group with a length (the sum of oxygen atoms and/or carbon atoms) of 1 to 20 that enables the liquid crystallinity to be maintained and does not decrease the compatibility with the liquid crystal material exhibiting a blue phase, whereby during polymer stabilization treatment (polymerization treatment), molecular interaction between the mesogenic skeletons each represented by X can be suppressed and phase separation can easily occur in the liquid crystal composition. Therefore, the temperature range of polymer stabilization treatment for obtaining the polymer/liquid crystal composite with a wide blue phase appearance temperature range can be widened. As the result, disorder of an orientation state of the polymer/liquid crystal composite exhibiting a polymer-stabilized blue phase can be reduced. Note that the present invention includes the case where the length of an alkylene group (the sum of oxygen atoms and/or carbon atoms) is larger than the length of the above range, as long as the length of an alkylene group enables the liquid crystallinity to be maintained and does not decrease the compatibility with the liquid crystal material exhibiting a blue phase. Note that "a liquid crystal composition exhibiting a blue phase" in this specification refers to a liquid crystal composition which has an optical modulation effect and in which liquid crystal is optically isotropic when no voltage is applied, whereas the orientation state is changed and thus the liquid crystal becomes optically anisotropic by voltage application.

In the above structure, as the liquid crystal material exhibiting a blue phase contained in the liquid crystal composition, there are a nematic liquid crystal compound and a smectic liquid crystal compound, and the nematic liquid crystal compound is preferred. Note that the nematic liquid crystal compound is not particularly limited, and examples thereof are a biphenyl-based compound, a terphenyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, an azo and azoxy based compound, a stilbene-based compound, a bicyclohexyl-based compound, a phenylpyrimidine-based compound, a biphenylpyrimidine-based compound, and a pyrimidine-based compound.

In the above structure, as a non-liquid-crystalline monomer contained in the liquid crystal composition, a monomer including a polymerizable group such as an acryloyl group, a methacryloyl group, a vinyl group, an epoxy group, a fumarate group, or a cinnamoyl group in a molecular structure is given, for example.

In the above structure, examples of a polymerization initiator included in the liquid crystal composition are acetophenone, benzophenone, benzoin, benzil, Michler's ketone, benzoin alkyl ether, benzyl dimethylketal, and thioxanthone.

Another embodiment of the present invention is a polymer/liquid crystal composite formed with use of a liquid crystal composition including a liquid crystal material exhibiting a blue phase and a liquid crystalline monomer. Note that the liquid crystal composition may include a non-liquid-crystalline monomer and a polymerization initiator.

Another embodiment of the present invention is a liquid crystal element formed with use of a liquid crystal composition including a liquid crystal material exhibiting a blue phase and a liquid crystalline monomer. Note that the liquid crystal composition may include a non-liquid-crystalline monomer and a polymerization initiator.

Another embodiment of the present invention is a liquid crystal element including a polymer/liquid crystal composite formed by polymerizing a liquid crystal composition including a liquid crystal material exhibiting a blue phase and a liquid crystalline monomer. Note that the liquid crystal composition may include a non-liquid-crystalline monomer and a polymerization initiator.

Another embodiment of the present invention is a liquid crystal display device formed with use of a liquid crystal composition including a liquid crystal material exhibiting a blue phase and a liquid crystalline monomer. Note that the liquid crystal composition may include a non-liquid-crystalline monomer and a polymerization initiator.

Another embodiment of the present invention is a liquid crystal display device including a polymer/liquid crystal composite formed by polymerizing a liquid crystal composition including a liquid crystal material exhibiting a blue phase and a liquid crystalline monomer. Note that the liquid crystal composition may include a non-liquid-crystalline monomer and a polymerization initiator.

With use of the liquid crystal composition that is one embodiment of the present invention, the temperature range of polymer stabilization treatment for obtaining the polymer/liquid crystal composite with a wider blue phase appearance temperature range can be widened. As the result, disorder of an orientation state of the polymer/liquid crystal composite exhibiting a polymer-stabilized blue phase can be reduced. Therefore, the yield of a liquid crystal element and a liquid crystal display device which utilize the polymer-stabilized blue phase of such a liquid crystal composition can be improved. The use of the liquid crystal composition which is one embodiment of the present invention can also decrease the driving voltage of the liquid crystal element, which leads to decrease in driving voltage of the liquid crystal display device. A novel material can be provided as a liquid crystalline monomer contained in the liquid crystal composition.

BRIEF DESCRIPTION OF DRAWINGS

In the accompanying drawings:

FIGS. 4A1, 4A2, and 4B illustrate modes of liquid crystal display devices;

BEST MODE FOR CARRYING OUT THE INVENTION

Hereinafter, embodiments of the present invention will be described with reference to the drawings. Note that the present invention is not limited to the description given below, and modes and details of the present invention can be modified in various ways without departing from the spirit and scope of the present invention. Therefore, the present invention should not be construed as being limited to the description in the following embodiments.

Note that liquid crystal display devices in this specification refer to image display devices, display devices, and light sources (including lighting devices). Further, the liquid crystal display devices include any of the following modules in its category: a module to which a connector such as an FPC (flexible printed circuit), TAB (tape automated bonding) tape, or a TCP (tape carrier package) is attached; a module having TAB tape or a TCP which is provided with a printed wiring board at the end thereof; and a module having an IC (integrated circuit) directly mounted on a substrate provided with a display element by a COG (chip on glass) method.

Embodiment 1

In this embodiment, a liquid crystal composition exhibiting a blue phase, and a polymer/liquid crystal composite obtained by polymer stabilization treatment (polymerization treatment) of the liquid crystal composition are described.

The liquid crystal composition described in this embodiment includes a liquid crystal material exhibiting a blue phase, a liquid crystalline monomer, a non-liquid-crystalline monomer, and a polymerization initiator.

The liquid crystal material exhibiting a blue phase refers to a liquid crystal material capable of exhibiting a so-called blue phase that substantially does not scatter light and is optically isotropic. As the liquid crystal material exhibiting a blue phase contained in the liquid crystal composition, there are a nematic liquid crystal compound and a smectic liquid crystal compound, and the nematic liquid crystal compound is preferred. Note that the nematic liquid crystal compound is not particularly limited, and examples thereof are a biphenyl-based compound, a terphenyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, an azo and azoxy based compound, a stilbene-based compound, a bicyclohexyl-based compound, a phenylpyrimidine-based compound, a biphenylpyrimidine-based compound, a pyrimidine-based compound, a biphenyl ethyne-based compound.

Figure 1A:
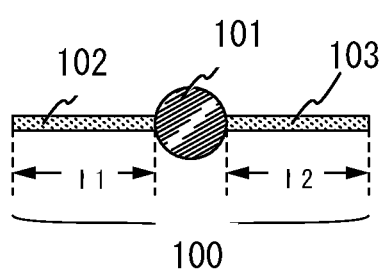
FIGS. 1A and 1B illustrate a liquid crystalline monomer.

The liquid crystalline monomer has a liquid crystallinity and is a monomer that can be polymerized by photopolymerization or thermopolymerization, for example. Specifically, the liquid crystalline monomer has a mesogenic skeleton 101, an alkylene group 102, and an alkylene group 103 as shown in FIG. 1a. Note that a mesogenic skeleton in this specification refers to a highly rigid unit having two or more rings such as aromatic rings. In FIG. 1a, the chain length of the alkylene group 102 is denoted by $r_{a1}$, and the chain length of the alkylene group 103 is denoted by $r_{a2}$. Note that the alkylene group 102 and the alkylene group 103 may be the same or different.

Figure 1B:
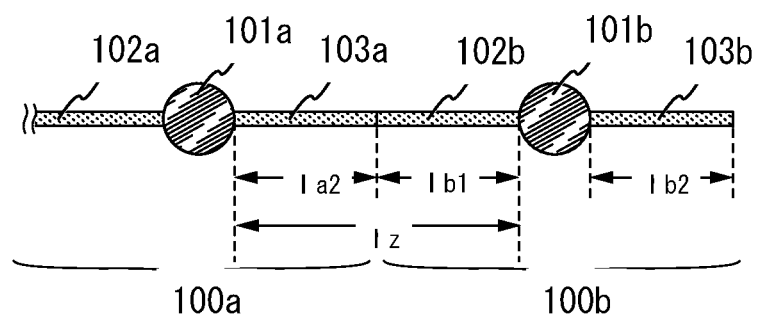

A polymer obtained by polymerization of the liquid crystalline monomer shown in FIG. 1a has a structure shown in FIG. 1b, for example. Accordingly, when a liquid crystalline monomer 100a is polymerized with a liquid crystalline monomer 100b, the length (distance) between a mesogenic skeleton 101a of the liquid crystalline monomer 100a and a mesogenic skeleton 101b of the liquid crystalline monomer 100b is represented by $r_z$ ($=r_{a1}+r_{b1}$).

Note that in one embodiment of the present invention, when polymer stabilization treatment (polymerization treatment) of the liquid crystal composition is performed, the length ($r_z$) between mesogenic skeletons of liquid crystalline monomers contained in the liquid crystal composition preferably lies in a certain range. In the case where a side chain of a liquid crystalline monomer is longer, the viscosity of the liquid crystal composition decreases and thus phase separation in the liquid crystal composition more easily occurs. Further, in a polymerization process of polymer stabilization treatment (polymerization treatment), when the length ($r_z$) between mesogenic skeletons is too short, the viscosity in the polymerization of the liquid crystalline monomer increases due to molecular interaction between mesogenic skeletons and thus the phase separation is less likely to occur, so that it becomes difficult to perform polymer stabilization. On the other hand, when the length ($r_z$) between mesogenic skeletons that are polymerized is too large, a problem of the decrease in the compatibility with a liquid crystal material occurs, for example.

Thus, by making the length ($r_z$) between mesogenic skeletons lie in a certain range, phase separation in the liquid crystal composition becomes easy to occur, so that the temperature range of polymer stabilization treatment for obtaining the polymer/liquid crystal composite with a wide blue phase appearance temperature range can be widened. As the result, disorder of an orientation state of the polymer/liquid crystal composite exhibiting a polymer-stabilized blue phase can be reduced. Note that the structures of the alkylene groups 102 and 103 in FIG. 1a may be the same or different.

The molecular interaction between the mesogenic skeletons is influenced by the length ($r_z$) between mesogenic skeletons; therefore, the liquid crystalline monomer according to one embodiment of the present invention by which the length ($r_z$) between mesogenic skeletons can lie in a certain range is represented by the following general formula (G1).

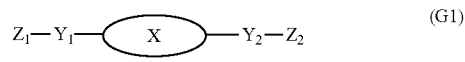
(G1)

In the general formula (G1), X represents a mesogenic skeleton; and $Y_1$ and $Y_2$ individually represent an alkylene group whose chain length (the sum of carbon atoms and/or oxygen atoms) is 1 to 20. The length of the alkylene group is a length that enables the liquid crystallinity to be maintained and does not decrease the compatibility with the liquid crystal material exhibiting a blue phase. The alkylene group may include an alkyl group as a side chain. In addition, the alkylene group and the alkyl group may include a carbonyl group and may have an ether bond. In addition, the carbonyl group and the ether bond may form an ester structure. In the general formula (G1), $Z_1$ and $Z_2$ individually represent an acryloyl group or a methacryloyl group.

Note that it is preferable that $Y_1$ and $Y_2$ in the general formula (G1) be individually an alkylene group whose chain length (the sum of oxygen atoms and/or carbon atoms) is an odd number.

As examples of a structure represented by X in the general formula (G1), specifically, the following structural formulae (s1) to (s8) are given.

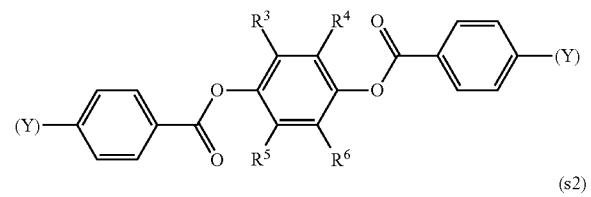
(s1)

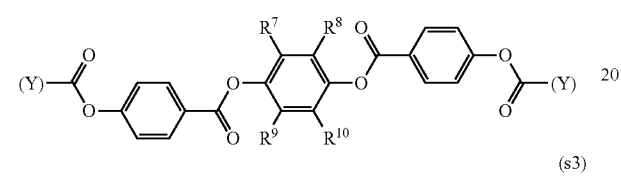
(s2)

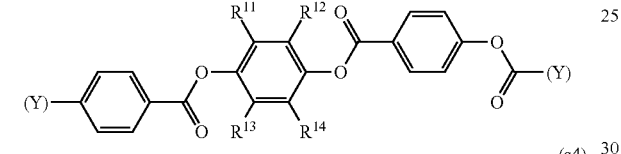
(s3)

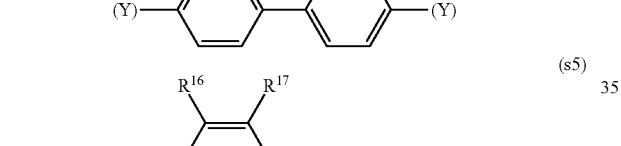
(s4)

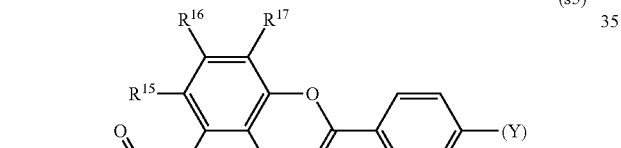
(s5)

(s6)

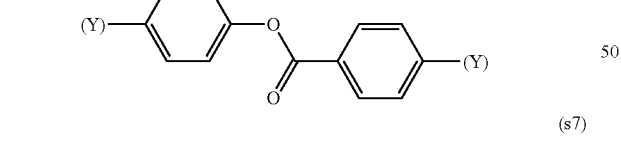
(s7)

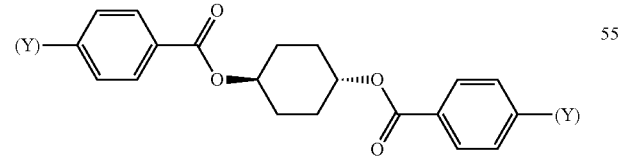
(s8)

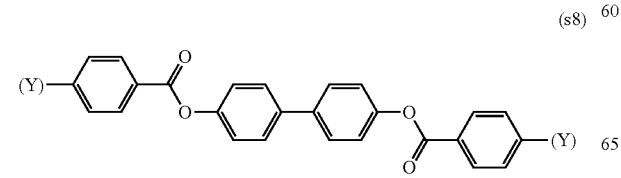

Note that (Y) in the structural formulae (s1) to (s8) represents a binding site with $Y_1$ or $Y_2$ in the general formula (G1). In addition, $R^3$ to $R^6$ in the structural formula (s1), $R^7$ to $R^{10}$ in the structural formula (s2), and $R^{11}$ to $R^{14}$ in the structural formula (s3) individually represent any one of hydrogen, a methyl group, and fluorine.

As a structure represented by $Y_1$ or $Y_2$ in the general formula (G1), specifically, the following structural formulae (t1) to (t48), and the like are given.

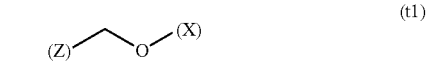 (t1)

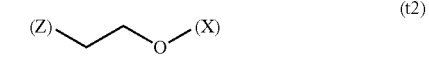 (t2)

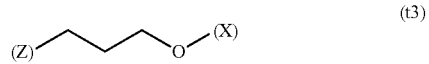 (t3)

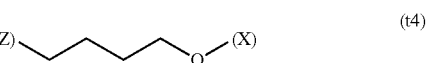 (t4)

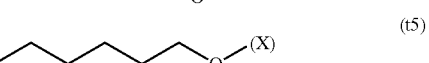 (t5)

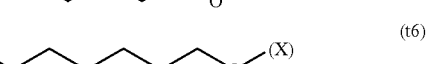 (t6)

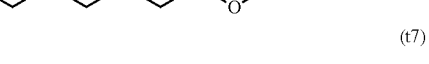 (t7)

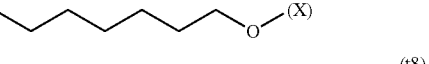 (t8)

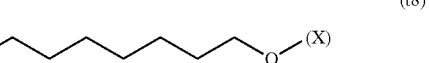 (t9)

 (t10)

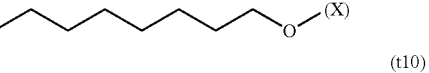 (t11)

 (t12)

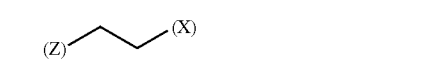 (t13)

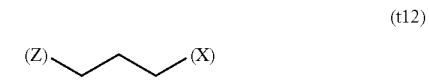 (t14)

 (t15)

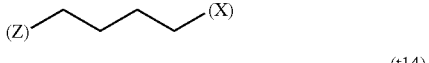 (t16)

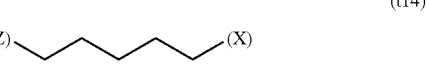 (t17)

 (t18)

-continued
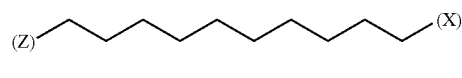 (t19)
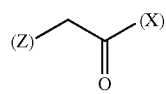 (t20)
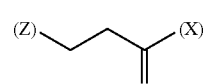 (t21)
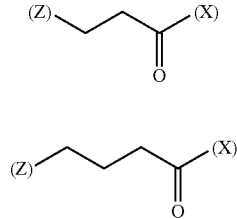 (t22)
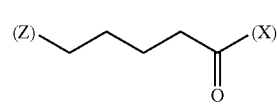 (t23)
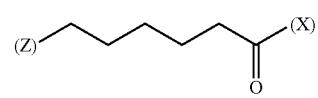 (t24)
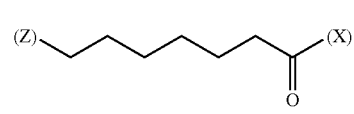 (t25)
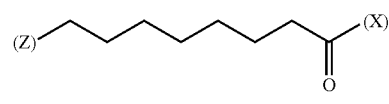 (t26)
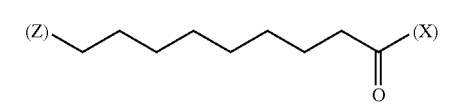 (t27)
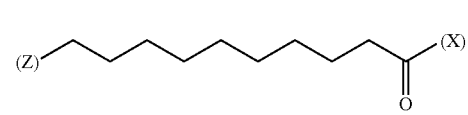 (t28)
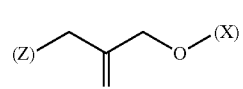 (t29)
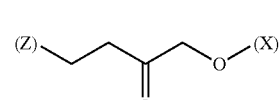 (t30)
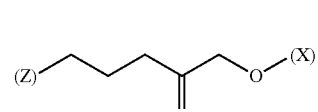 (t31)
-continued
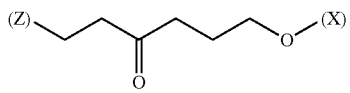 (t32)
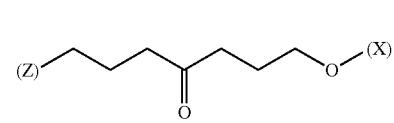 (t33)
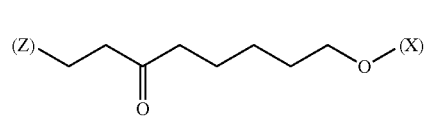 (t34)
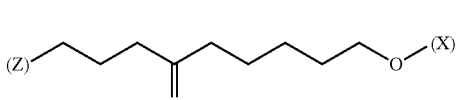 (t35)
 (t36)
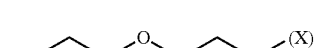 (t37)
 (t38)
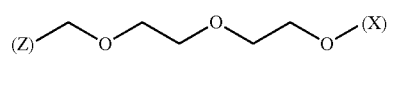 (t39)
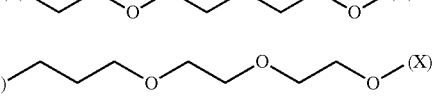 (t40)
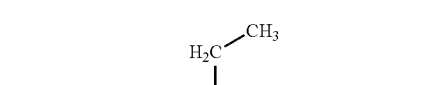 (t41)
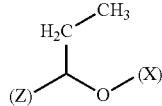 (t42)
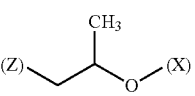 (t43)
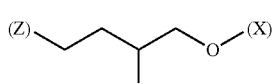 (t44)
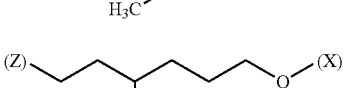 (t45)
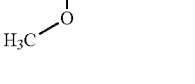 (t46)
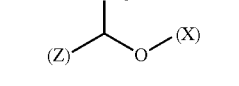 (t47)

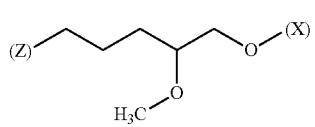
(t48)

Note that (X) in the structural formulae (t1) to (t48) represents a binding site with X in the general formula (G1), and (Z) in the structural formulae (t1) to (t48) represents a binding site with $Z_1$ or $Z_2$ in the general formula (G1). In the alkylene group represented by the structural formulae (t1) to (t48), (Z) may be bonded to the site indicated by (X), and (X) may be bonded to the site indicated by (Z).

As a structure represented by $Z_1$ or $Z_2$ in the general formula (G1), specifically, the following structural formulae (u1), (u2), and the like are given.

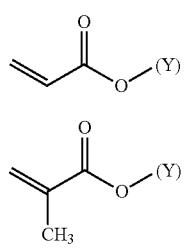

(u1)

(u2)

The liquid crystalline monomer according to one embodiment of the present invention may have a structure represented by the following general formula (G1-1).

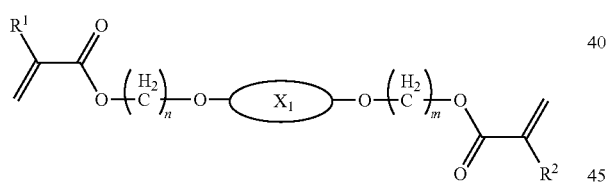

(G1-1)

In the general formula (G1-1), $X_1$ represents a mesogenic skeleton; and $R^1$ and $R^2$ individually represent any one of hydrogen and a methyl group. In the general formula (G1-1), n and m are individually any one of 1 to 19 which enable the liquid crystallinity to be maintained and does not decrease the compatibility with the liquid crystal material exhibiting a blue phase.

As a structure represented by $X_1$ in the general formula (G1-1), specifically, the following structural formulae (s11) to (s18), and the like are given.

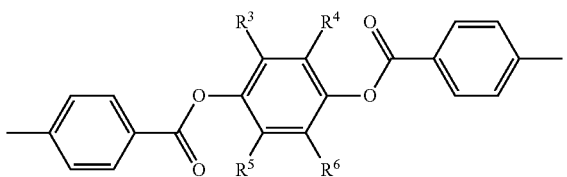

(s11)

(s12)

(s13)

(s14)

(s15)

(s16)

(s17)

(s18)

Note that $R^3$ to $R^6$ in the structural formula (s11), $R^7$ to $R^{10}$ in the structural formula (s12), $R^{11}$ to $R^{14}$ in the structural formula (s13), and $R^{15}$ to $R^{18}$ in the structural formula (s15) individually represent any one of hydrogen, a methyl group, and fluorine.

As specific examples of the liquid crystalline monomer represented by the general formula (G1) or the general formula (G1-1), liquid crystalline monomers represented by structural formulae (100) to (110) are given. However, the present invention is not limited to these structural formulae.

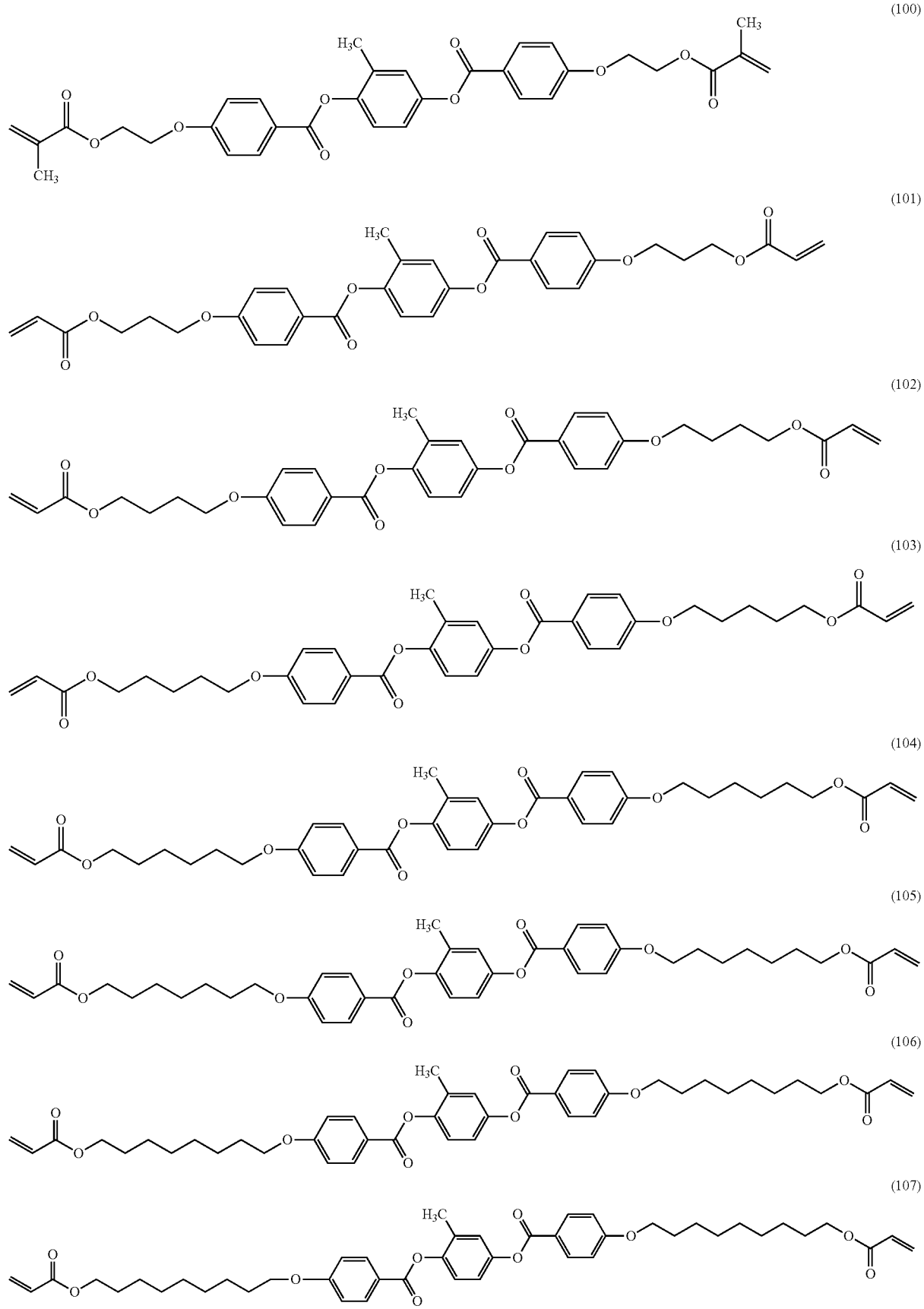

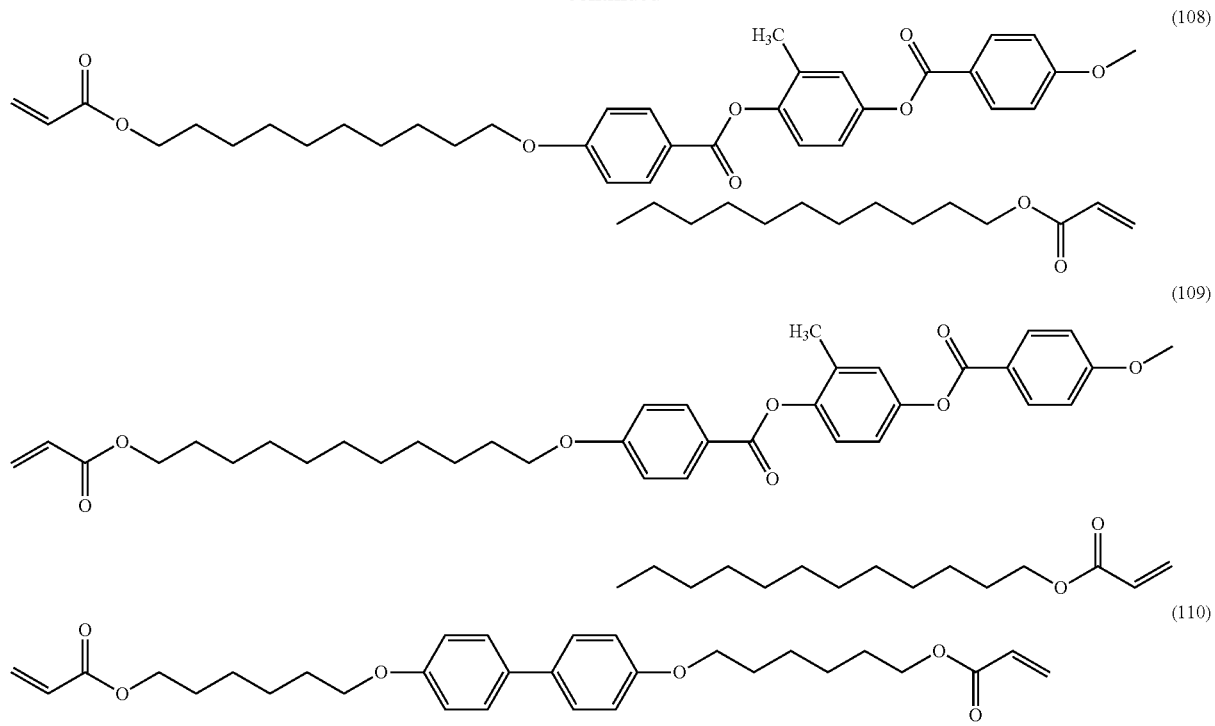

Note that the liquid crystalline monomer represented by the structural formula (100) is 1,4-bis[4-(2-methacryloyloxy-ethyl-1-oxy)benzoyloxy]-2-methylbenzene (abbreviation: MeRM-O2), which has an alkylene group whose chain length (the sum of oxygen atoms and/or carbon atoms) is 3.

The liquid crystalline monomer in the structural formula (101) is 1,4-bis[4-(3-acryloyloxy-n-propyl-1-oxy)benzoyloxy]-2-methylbenzene (abbreviation: RM-O3), which has an alkylene group whose chain length (the sum of oxygen atoms and/or carbon atoms) is 4.

The liquid crystalline monomer in the structural formula (102) is 1,4-bis[4-(4-acryloyloxy-n-butyl-1-oxy)benzoyloxy]-2-methylbenzene (abbreviation: RM-O4), which has an alkylene group whose chain length (the sum of oxygen atoms and/or carbon atoms) is 5.

The liquid crystalline monomer in the structural formula (103) is 1,4-bis[4-(5-acryloyloxy-n-pentyl-1-oxy)benzoyloxy]-2-methylbenzene (abbreviation: RM-O5), which has an alkylene group whose chain length (the sum of oxygen atoms and/or carbon atoms) is 6.

The liquid crystalline monomer in the structural formula (104) is 1,4-bis[4-(6-acryloyloxy-n-hexyl-1-oxy)benzoyloxy]-2-methylbenzene (abbreviation: RM-O6), which has an alkylene group whose chain length (the sum of oxygen atoms and/or carbon atoms) is 7.

The liquid crystalline monomer in the structural formula (105) is 1,4-bis[4-(7-acryloyloxy-n-heptyl-1-oxy)benzoyloxy]-2-methylbenzene (abbreviation: RM-O7), which has an alkylene group whose chain length (the sum of oxygen atoms and/or carbon atoms) is 8.

The liquid crystalline monomer in the structural formula (106) is 1,4-bis[4-(8-acryloyloxy-n-octyl-1-oxy)benzoyloxy]-2-methylbenzene (abbreviation: RM-O8), which has an alkylene group whose chain length (the sum of oxygen atoms and/or carbon atoms) is 9.

The liquid crystalline monomer in the structural formula (107) is 1,4-bis[4-(9-acryloyloxy-n-nonyl-1-oxy)benzoyloxy]-2-methylbenzene (abbreviation: RM-O9), which has an alkylene group whose chain length (the sum of oxygen atoms and/or carbon atoms) is 10.

The liquid crystalline monomer in the structural formula (108) is 1,4-bis[4-(10-acryloyloxy-n-decyl-1-oxy)benzoyloxy]-2-methylbenzene (abbreviation: RM-O10), which has an alkylene group whose chain length (the sum of oxygen atoms and/or carbon atoms) is 11.

The liquid crystalline monomer in the structural formula (109) is 1,4-bis[4-(11-acryloyloxy-n-undecyl-1-oxy)benzoyloxy]-2-methylbenzene (abbreviation: RM-O11), which has an alkylene group whose chain length (the sum of oxygen atoms and/or carbon atoms) is 12.

The liquid crystalline monomer in the structural formula (110) is 4,4'-bis(6-acryloyloxy-n-hexyl-1-oxy)-1,1'-biphenyl (abbreviation: Dac-PP-O6), which has an alkylene group whose chain length (the sum of oxygen atoms and/or carbon atoms) is 7.

A non-liquid-crystalline monomer indicates a monomer that does not have a liquid crystallinity, can undergo polymerization through photopolymerization or thermopolymerization, and does not have a rod-shaped molecular structure (for example, a molecular structure with an alkyl group, a cyano group, a fluorine or the like attached to a terminus of a biphenyl group, a biphenyl-cyclohexyl group, or the like). Specifically, monomers containing polymerizable groups such as acryloyl groups, methacryloyl groups, vinyl groups, epoxy groups, fumarate groups, cinnamoyl groups and the like are cited; however, the non-liquid crystalline monomer is not limited to these examples.

As the polymerlization reaction, photopolymerization reaction or thermopolymerization reaction may be employed, and photopolymerization reaction is preferred. In particular, photopolymerization reaction with ultraviolet light is preferred. Therefore, as a polymerization initiator, acetophenone, benzophenone, benzoin, benzil, Michler's ketone, benzoin alkyl ether, benzyl dimethylketal, or thioxanthone can be used as appropriate, for example. Note that after the polymer stabilization treatment, the polymerization initiator becomes an impurity that does not contribute to operation of a liquid crystal display device in the polymer/liquid crystal composite; therefore, the amount of the polymerization initiator is preferably as small as possible. For example, the amount of the polymerization initiator is preferably less than or equal to 0.5 wt % in the liquid crystal composition.

The liquid crystal composition may contain a chiral agent, in addition to the liquid crystal material exhibiting a blue phase, the liquid crystalline monomer, the non-liquid-crystalline monomer, and the polymerization initiator. Note that a chiral agent is an agent with which a twist structure is caused in a liquid crystal material. The additive amount of the chiral agent influences the diffraction wavelength of the liquid crystal material exhibiting a blue phase. Therefore, the additive amount of the chiral agent is preferably adjusted so that the diffraction wavelength of the liquid crystal material exhibiting a blue phase is out of a visible region (380 nm to 750 nm). As the chiral agent, S-811 (produced by Merck Ltd., Japan), S-1011 (produced by Merck Ltd., Japan), 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.), or the like can be selected as appropriate.

The liquid crystal composition which is one embodiment of the present invention includes the above-described materials. Further, by polymer stabilization treatment (polymerization treatment) of the liquid crystal composition, the polymer/liquid crystal composite exhibiting a polymer-stabilized blue phase can be obtained.

Note that in the case where photopolymerization reaction is employed as the polymer stabilization treatment (polymerization treatment) of the liquid crystal composition, the treatment temperature is preferably a temperature at which the polymer/liquid crystal composite obtained by the polymer stabilization treatment (polymerization treatment) exhibits a polymer-stabilized blue phase. In particular, a temperature at which the liquid crystal composition and the polymer/liquid crystal composite can keep (an isotropic phase or) a blue phase is preferable. The treatment temperature may be a temperature at which the polymer/liquid crystal composite obtained through the polymer stabilization treatment (polymerization treatment) can keep a blue phase even though the liquid crystal composition exhibits an isotropic phase. In addition, the treatment temperature may be changed during the polymer stabilization treatment (polymerization treatment). In that case, the temperature is such that polymerization starts at the temperature where the liquid crystal composition exhibits an isotropic phase or a blue phase, and the polymer/liquid crystal composite exhibits a blue phase.

Within the above temperature range, photopolymerization reaction is performed by irradiation with ultraviolet light or the like. Note that a period of time for the polymerization may be adjusted depending on a material contained in the liquid crystal composition, as appropriate.

With use of the liquid crystal composition that is one embodiment of the present invention, the temperature range of polymer stabilization treatment for obtaining the polymer/liquid crystal composite with a wider blue phase appearance temperature range can be widened. As the result, disorder of an orientation state of the polymer/liquid crystal composite can be reduced.

The structures and methods described in this embodiment can be combined as appropriate with any of the structures and methods described in the other embodiments.

Embodiment 2

Figure 2:
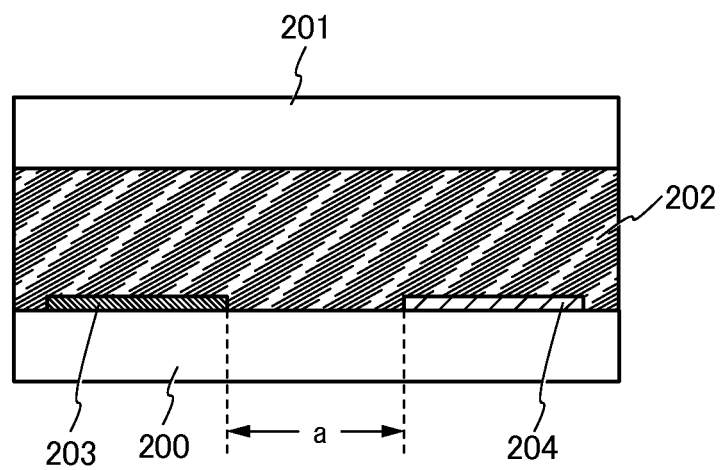
FIG. 2 illustrates one mode of a liquid crystal element.

In this embodiment, an example of a liquid crystal element using the polymer/liquid crystal composite that is obtained by polymerization of the liquid crystal composition described in Embodiment 1 is described with reference to FIG. 2. FIG. 2 is a cross-sectional view of the liquid crystal element.

In FIG. 2, a liquid crystal layer 202 is formed between a first substrate 200 and a second substrate 201. The polymer/liquid crystal composite described in Embodiment 1 is used for the liquid crystal layer 202. A pixel electrode layer 203 and a common electrode layer 204 are adjacently formed over the first substrate 200.

A method in which grayscale is controlled by generating an electric field which is substantially parallel to a substrate (i.e., in a horizontal direction) to move liquid crystal molecules substantially parallel to the substrate (i.e., in a horizontal direction) is applied to the liquid crystal element of this embodiment.

Note that the a distance α (shown in FIG. 2) between the pixel electrode layer 203 and the common electrode layer 204, which are adjacently formed with the liquid crystal layer 202 interposed therebetween, is a distance at which liquid crystal that is included in the liquid crystal layer 202 and exists between the pixel electrode layer 203 and the common electrode layer 204 responds when given voltages are applied to the pixel electrode layer 203 and the common electrode layer 204. The applied voltage is controlled as appropriate in accordance with the distance α.

As the first substrate 200 and the second substrate 201, a glass substrate made of barium borosilicate glass, aluminoborosilicate glass, or the like, a quartz substrate, a plastic substrate, or the like can be used.

The pixel electrode layer 203 and the common electrode layer 204 can be formed using one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organoindium, organotin, indium oxide containing tungsten oxide, indium zinc oxide containing tungsten oxide, indium oxide containing titanium oxide, and indium tin oxide containing titanium oxide; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and nitrides thereof.

The liquid crystal layer 202 can be obtained as follows: the liquid crystal composition described in Embodiment 1 is provided between the first substrate 200 and the second substrate 201 by a liquid crystal dropping method (one drop fill, ODF), a liquid crystal injection method, or the like, and then is polymerized to be a polymer/liquid crystal composite. Note that the thickness (film thickness) of the liquid crystal layer 202 is preferably greater than or equal to 1 μm and less than or equal to 20 μm.

In the thus formed liquid crystal element, since an electric field in a horizontal direction is generated between the pixel electrode layer 203 and the common electrode layer 204, the liquid crystal molecules in the liquid crystal layer 202 can be controlled in a direction parallel to the first substrate 201.

The liquid crystal element of this embodiment can exhibit a polymer-stabilized blue phase. The polymer/liquid crystal composite used for the liquid crystal layer 202 is a light-emitting element that is capable of high-speed response and can provide high contrast.

For the liquid crystal element of this embodiment, optical films such as a polarizing plate, a retardation plate, and an anti-reflection film can be used in combination, as appropriate. For example, circular polarization by the polarizing plate and the retardation plate may be used. In addition, a backlight or the like may be used as a light source.

Note that the liquid crystal element of this embodiment can be applied to a transmissive liquid crystal display device in which display is performed by transmission of light from a light source, a reflective liquid crystal display device in which display is performed by reflection of incident light, or a semi-transmissive liquid crystal display device in which a transmissive type and a reflective type are combined.

Embodiment 3

In this embodiment, a liquid crystal display device in which the liquid crystal composition that is one embodiment of the present invention is used for a liquid crystal layer is described. Note that the liquid crystal display device of this embodiment includes the liquid crystal element (also referred to as a liquid crystal display element) described in Embodiment 2 as a display element. The liquid crystal display device may be a passive-matrix liquid crystal display device or an active-matrix liquid crystal display device, and in this embodiment, the case where the liquid crystal element is applied to an active matrix liquid crystal display device is described with reference to FIGS. 3A and 3B.

Figure 3A:
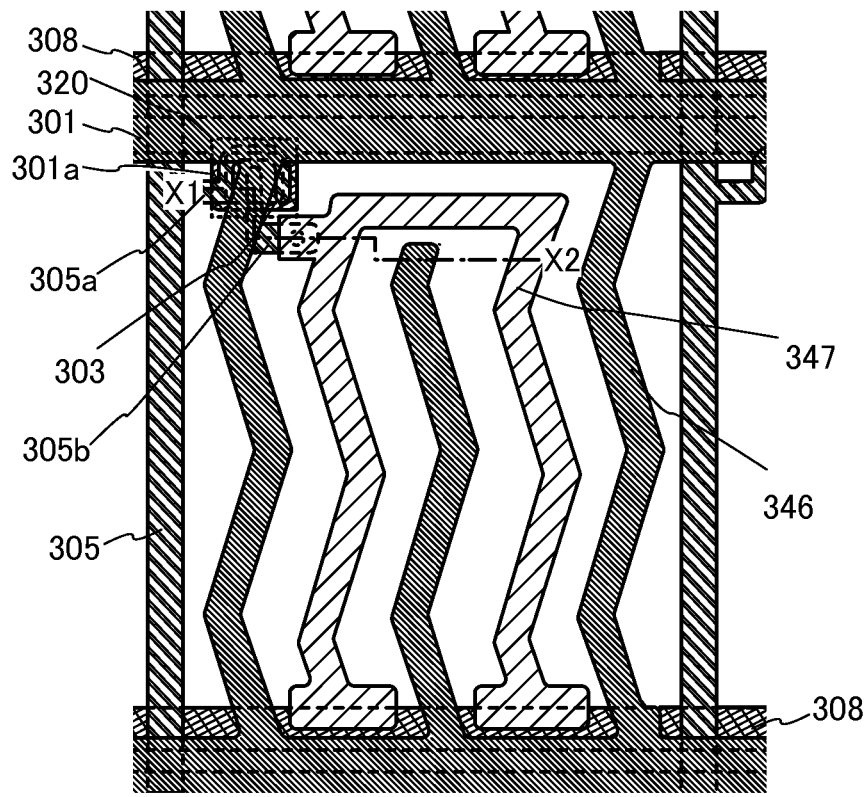
FIGS. 3A and 3B illustrate one mode of a liquid crystal display device.
Figure 3B:
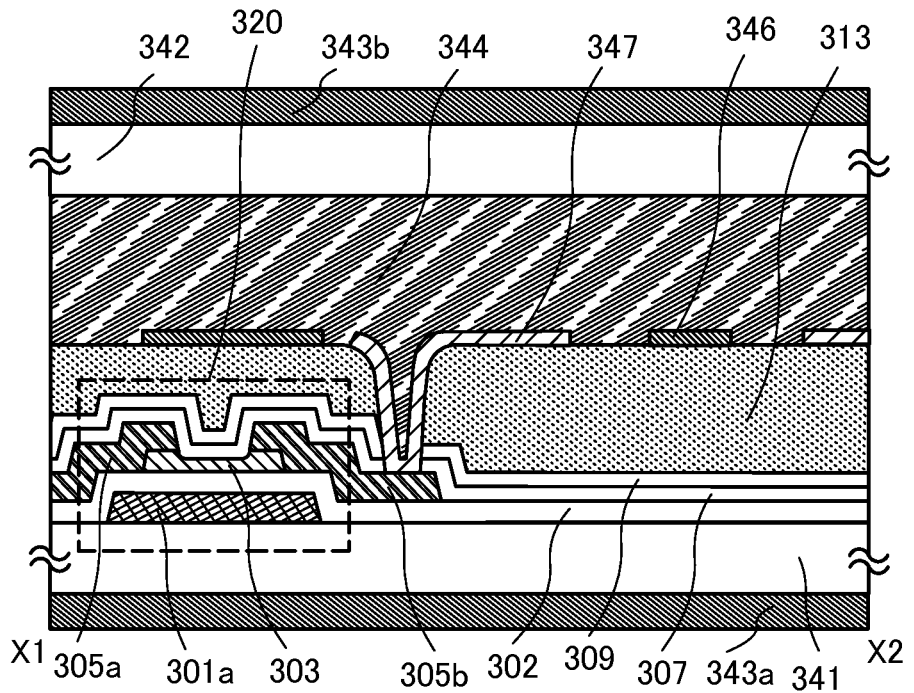

FIG. 3A is a plan view of a liquid crystal display device and illustrates one pixel thereof. FIG. 3B is a cross-sectional view taken along X1-X2 in FIG. 3A.

In FIG. 3A, a plurality of source wiring layers 305 (including a wiring layer 305a) is provided in parallel to each other (extended in the vertical direction in FIG. 3A) and apart from each other. A plurality of gate wiring layers 301 (including a gate electrode layer 301a) is provided apart from each other and extended in the direction substantially orthogonal to the source wiring layers 305 (extended in the horizontal direction in FIG. 3A). A plurality of common wiring layers 308 is provided to adjoin the respective gate wiring layers 301 and extended in the direction parallel to the gate wiring layers 301, that is, in the direction substantially orthogonal to the source wiring layers 305 (extended in the horizontal direction in FIG. 3A). A pixel electrode layer 347 and a common electrode layer 346 of the liquid crystal display device are arranged in a space surrounded by the source wiring layers 305, the common wiring layers 308, and the gate wiring layers 301. Note that the pixel electrode layer 347 is electrically connected to a transistor 320, and the transistor 320 is provided in each pixel.

In the liquid crystal display device of FIG. 3A, capacitor is formed by the pixel electrode layer 347 and the common wiring layer 308. Although the common electrode layer 308 can operate in a floating state (an electrically isolated state), the potential thereof may be set to a fixed potential, preferably to a potential around a common potential (an intermediate potential of an image signal which is transmitted as data) in such a level as not to generate flickers.

In the electrode structure in the liquid crystal display device of FIGS. 3A and 3B, the pixel electrode layer 347 and the common electrode layer 346 are formed in one plane that is parallel to the substrate. A method in which grayscale is controlled by generating an electric field in the direction parallel to a substrate to move liquid crystal molecules in a plane parallel to the substrate (i.e., an IPS mode) can be applied to the electrode structure.

Next, a cross-sectional structure of the liquid crystal display device shown in FIG. 3B is described. The liquid crystal display device shown in FIG. 3B has a structure in which a liquid crystal layer 344 is provided between a second substrate 342 and a first substrate 341 including the transistor 320, the pixel electrode layer 347, the common electrode layer 346, and the like. Further, polarizing plates 343a and 343b are provided in contact with the first substrate 341 and the second substrate 342, respectively.

Note that the transistor 320 is an inverted staggered thin film transistor in which the gate electrode layer 301a, a gate insulating layer 302, a semiconductor layer 303, and wiring layers 305a and 305b which function as a source electrode layer and a drain electrode layer are formed over the first substrate 341 having an insulating surface.

There is no particular limitation on the structure of the transistor that can be applied to a liquid crystal display device of this embodiment; for example, a staggered type transistor or a planar type transistor having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual gate structure including two gate electrode layers positioned over and below a channel region with a gate insulating layer provided therebetween.

In FIG. 3B, the gate electrode layer 301a is formed over the first substrate 341. The gate electrode layer 301a can be formed to have a single-layer or stacked structure using a metal material such as molybdenum, titanium, chromium, tantalum, tungsten, aluminum, copper, neodymium, or scandium, or an alloy material including any of these materials as a main component. By using a light-blocking conductive film as the gate electrode layer 301a, light from a backlight (light emitted through the first substrate 341) can be prevented from entering the semiconductor layer 303.

The gate electrode layer 301a may have a stacked structure. For example, in the case where the gate electrode layer 301a has a two-layer structure, a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and molybdenum layer are stacked is preferable. In the case where the gate electrode layer 301a has a three-layer structure, a stacked structure of a tungsten layer or a tungsten nitride layer, a layer of an alloy of aluminum and silicon or a layer of an alloy of aluminum and titanium, and a titanium nitride layer or a titanium layer is preferable.

Note that a base film formed of an insulating film may be provided between the first substrate 341 and the gate electrode layer 301a. The base film has a function of preventing diffusion of an impurity element from the first substrate 341, and can be formed to have a single-layer structure or a stacked structure using one or more of a silicon nitride film, a silicon oxide film, a silicon nitride oxide film, and a silicon oxynitride film.

The gate insulating layer 302 can be formed to have a single-layer structure or a stacked structure using a silicon oxide layer, a silicon nitride layer, a silicon oxynitride layer, or a silicon nitride oxide layer by a plasma CVD method, a sputtering method, or the like. Alternatively, a silicon oxide layer formed by a CVD method using an organosilane gas can be used as the insulating layer 302. As the organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

A material used for the semiconductor layer 303 is not limited to a particular material and may be determined in accordance with characteristics needed for the transistor 320, as appropriate. The semiconductor layer 303 can be formed using the following material: an amorphous semiconductor manufactured by a sputtering method or a vapor-phase growth method using a semiconductor source gas typified by silane or germane; a polycrystalline semiconductor formed by crystallizing the amorphous semiconductor with use of light energy or thermal energy; a microcrystalline semiconductor; an oxide semiconductor; or the like.

A typical example of an amorphous semiconductor is hydrogenated amorphous silicon, while a typical example of a crystalline semiconductor is polysilicon and the like. Polysilicon (polycrystalline silicon) includes high-temperature polysilicon which contains polysilicon formed at a process temperature of 800° C. or higher as its main component, low-temperature polysilicon which contains polysilicon formed at a process temperature of 600° C. or lower as its main component, and polysilicon formed by crystallizing amorphous silicon by using an element or the like which promotes crystallization. Needless to say, as described above, a microcrystalline semiconductor or a semiconductor which includes a crystal phase in part of a semiconductor layer can also be used.

As the oxide semiconductor, the following can be used: a four-component metal oxide such as In—Sn—Ga—Zn—O-based oxide semiconductor; a three-component metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor; a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, an In—Ga—O-based oxide semiconductor; or an In—O-based oxide semiconductor, a Sn—O-based oxide semiconductor, or a Zn—O-based oxide semiconductor layer which are oxides of one metal element can be used. Further, $SiO_2$ may be contained in the above oxide semiconductor. Here, for example, the In—Ga—Zn—O-based oxide semiconductor means an oxide containing at least In, Ga, and Zn, and the composition ratio of the elements is not particularly limited. The In—Ga—Zn—O-based oxide semiconductor may contain an element other than In, Ga, and Zn.

Note that as the oxide semiconductor, a thin film represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like. Note that the oxide semiconductor has neither a single crystal structure nor an amorphous structure and is a crystalline oxide semiconductor having c-axis alignment (also referred to as a c-axis aligned crystalline (CAAC) oxide semiconductor).

The semiconductor layer 303 can be formed by a sputtering method, an LPCVD method, a plasma CVD method, or the like. At an etching step for processing the semiconductor layer 303 into a desired shape, dry etching or wet etching can be used.

Note that as an etching apparatus used for the dry etching, an etching apparatus using a reactive ion etching method (an RIE method), or a dry etching apparatus using a high-density plasma source such as ECR (electron cyclotron resonance) or ICP (inductively coupled plasma) can be used. As a dry etching apparatus by which uniform electric discharge can be obtained over a wider area as compared to an ICP etching apparatus, there is an ECCP (enhanced capacitively coupled plasma) mode apparatus in which an upper electrode is grounded, a high-frequency power source at 13.56 MHz is connected to a lower electrode, and further a low-frequency power source at 3.2 MHz is connected to the lower electrode. This ECCP mode etching apparatus can be applied even when a substrate the size of which exceeds 3 m of the tenth generation is used as a substrate, for example.

As a material for the wiring layers 305a and 305b which serve as the source and drain electrode layers of the transistor 320, there are an element selected from aluminum (Al), chromium (Cr), tantalum (Ta), titanium (Ti), molybdenum (Mo), tungsten (W), copper (Cu), and magnesium (Mg), an alloy containing any of these elements as a component, an alloy in which any of these elements are combined, and the like. Further, in the case where heat treatment is performed, the conductive film preferably has heat resistance against the heat treatment. For example, since the use of Al alone brings disadvantages such as low heat resistance and a tendency to corrosion, aluminum is used in combination with a conductive material having heat resistance. As the conductive material having heat resistance which is combined with aluminum, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy film containing a combination of any of these elements, or a nitride containing any of these elements as its component.

Note that the gate insulating layer 302, the semiconductor layer 303, and the wiring layers 305a and 305b may be successively formed without exposure to air. Such successive formation without exposure to air leads to a formation of each interface of the stacked layers without contamination by atmospheric components or impurity elements floating in air, so that variation in characteristics of the transistor can be reduced.

An inorganic insulating film or an organic insulating film formed by a dry method or a wet method can be used for the insulating film 307 and an insulating film 309. For example, it is possible to use a silicon nitride film, a silicon oxide film, a silicon oxynitride film, an aluminum oxide film, or a tantalum oxide film, which is formed by a CVD method, a sputtering method, or the like. Alternatively, an organic material such as polyimide, acrylic, benzocyclobutene, polyamide, or an epoxy resin can be used. Other than such organic materials, a low-dielectric constant material (a low-k material), a siloxane-based resin, phosphosilicate glass (PSG), borophosphosilicate glass (BPSG), or the like can be used. A gallium oxide film can also be used as the insulating film 307.

Note that the siloxane-based resin corresponds to a resin including an Si—O—Si bond formed using a siloxane-based material as a starting material. A siloxane-based resin may include, as a substituent, an organic group (e.g., an alkyl group or an aryl group) or a fluoro group. A siloxane-based resin is applied by a coating method and baked; thus, the insulating film 307 can be formed.

Note that the insulating film 307 and the insulating film 309 may be formed to have a stacked structure including a plurality of insulating films formed using the above-described materials. For example, a structure where an organic resin film is stacked over an inorganic insulating film may be employed.

The interlayer film 313 can be formed by the same material as the material used for the insulating film 307 and the insulating film 309. There is no particular limitation on the method for forming the interlayer film 313, and the following method can be employed depending on the material: spin coating, dip coating, spray coating, droplet discharging (such as ink jetting, screen printing, or offset printing), roll coating, curtain coating, knife coating, or the like.

The pixel electrode layer 347 and the common electrode layer 308 can be formed using a light-transmitting conductive material such as an indium oxide containing a tungsten oxide, an indium zinc oxide containing a tungsten oxide, an indium oxide containing a titanium oxide, an indium tin oxide containing a titanium oxide, an indium tin oxide (hereinafter referred to as ITO), an indium zinc oxide, or an indium tin oxide to which a silicon oxide is added. Alternatively, the pixel electrode layer 347 and the common electrode layer 308 can be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy containing any of these metals; and a nitride of these metals.

Alternatively, the pixel electrode layer 347 and the common electrode layer 308 can be formed using a conductive composition including a conductive high molecule (also referred to as a conductive polymer). The pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 Ω·cm. Note that as the conductive polymer, a so-called π electron conjugated conductive polymer can be used. For example, polyaniline or a derivative thereof, polypyrrole or a derivative thereof, polythiophene or a derivative thereof, a copolymer of two or more kinds of aniline, pyrrole, and thiophene or a derivative thereof, and the like are given.

For the liquid crystal layer 344, the liquid crystal composition that is one embodiment of the present invention is used. Note that the liquid crystal composition includes the liquid crystal material exhibiting a blue phase, the liquid crystalline monomer, the non-liquid-crystalline monomer, and the polymerization initiator. A polymer/liquid crystal composite obtained by polymer stabilization treatment (polymerization treatment) of the liquid crystal composition is used for the liquid crystal layer 344.

Note that although not shown here, the liquid crystal composition for forming the liquid crystal layer 344 is formed between the first substrate 341 and the second substrate 342 that is a counter substrate, and then the first and second substrates are bonded with a sealant. The liquid crystal layer 344 can be formed between the first and second substrates by a dispenser method (dropping method), or a method in which the first substrate 341 is bonded to the second substrate 342 and then liquid crystal is injected using a capillary phenomenon or the like.

As the sealant, it is typically preferable to use a visible light curable resin, an ultraviolet curable resin, or a thermosetting resin. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included in the sealant.

After the space between the first substrate 341 and the second substrate 342 is filled with the liquid crystal composition, polymer stabilization treatment (polymerization treatment) is performed by light irradiation, whereby the liquid crystal layer 344 is formed. The light has a wavelength with which the liquid crystalline monomer, the non-liquid-crystalline monomer, and the polymerization initiator included in the liquid crystal composition react. Through the polymer stabilization treatment (polymerization treatment) by the light irradiation, the liquid crystal layer 344 is obtained. Note that in the case of using a photocurable resin as a sealant, curing of the sealant may be performed simultaneously with the polymer stabilization treatment.

Note that according to the structure of an electrode in the liquid crystal display device of this embodiment, liquid crystal molecules included in the liquid crystal layer 344 are controlled by an electric field in the holizontal direction. The polymer/liquid crystal composite is aligned so as to exhibit a blue phase, and can be controlled in the direction parallel to the substrate; thus, a wide viewing angle can be obtained.

In this embodiment, the polarizing plate 343a is provided on the outer side (on the side opposite to the liquid crystal layer 344) of the first substrate 341, and the polarizing plate 343b is provided on the outer side (on the side opposite to the liquid crystal layer 344) of the second substrate 342. In addition to a polarizing plate, an optical film such as a retardation plate or an anti-reflection film may be provided. For example, circular polarization by the polarizing plate and the retardation plate may be used.

Although not shown, a backlight, a sidelight, or the like can be used as a light source of the liquid crystal display device of this embodiment. Light from the light source is emitted from the first substrate 341 side so as to pass through the second substrate 342 on the viewing side.

In the case of manufacturing a plurality of liquid crystal display devices using a large-sized substrate (a so-called multiple panel method), a division step can be performed before the polymer stabilization treatment or before provision of the polarizing plates. In consideration of the influence of the division step on the liquid crystal layer (such as disorder of an orientation state due to force applied in the division step), it is preferable that the division step be performed after the attachment of the first substrate 341 and the second substrate 342 and before the polymer stabilization treatment.

In the liquid crystal display device of this embodiment, with use of the liquid crystal composition that is one embodiment of the present invention, the temperature range of polymer stabilization treatment for obtaining the polymer/liquid crystal composite with a wider blue phase appearance temperature range can be widened. As the result, defects of a panel of the liquid crystal display device can be reduced, so that the yield of the liquid crystal display device can be improved. The use of the liquid crystal composition which is one embodiment of the present invention can also decrease the driving voltage of the liquid crystal element, which leads to decrease in driving voltage of the liquid crystal display device.

In the liquid crystal display device of this embodiment, the polymer/liquid crystal composite can exhibit the polymer-stabilized blue phase and provide high contrast; thus, a high-definition liquid crystal display device with high visibility can be provided. Further, since the polymer/liquid crystal composite is capable of high-speed response, a liquid crystal display device with higher performance can be achieved.

The structures described in this embodiment can be combined as appropriate with any of the structures described in the other embodiments.

Embodiment 4

In this embodiment, a liquid crystal display device in which the liquid crystal composition that is one embodiment of the present invention is used for a liquid crystal layer is described. Note that the liquid crystal display device of this embodiment includes the liquid crystal element (also referred to as a liquid crystal display element) described in Embodiment 2 as a display element.

Figure 4B:
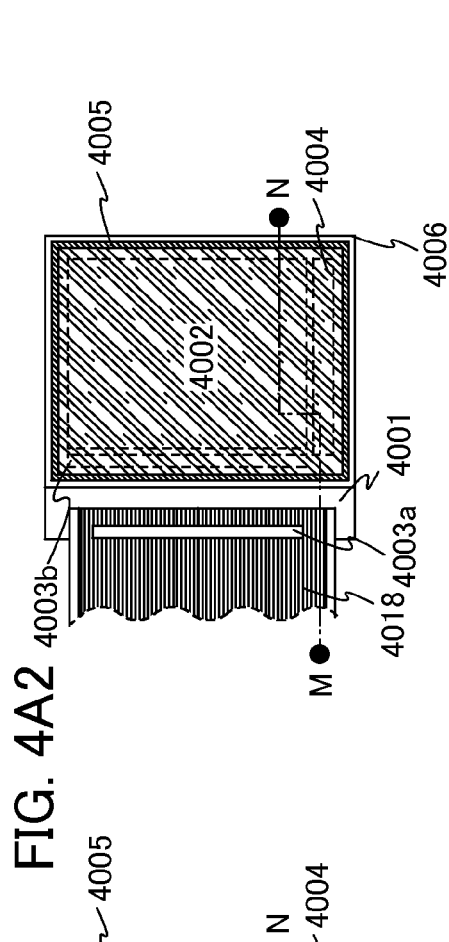
Figure 4B:
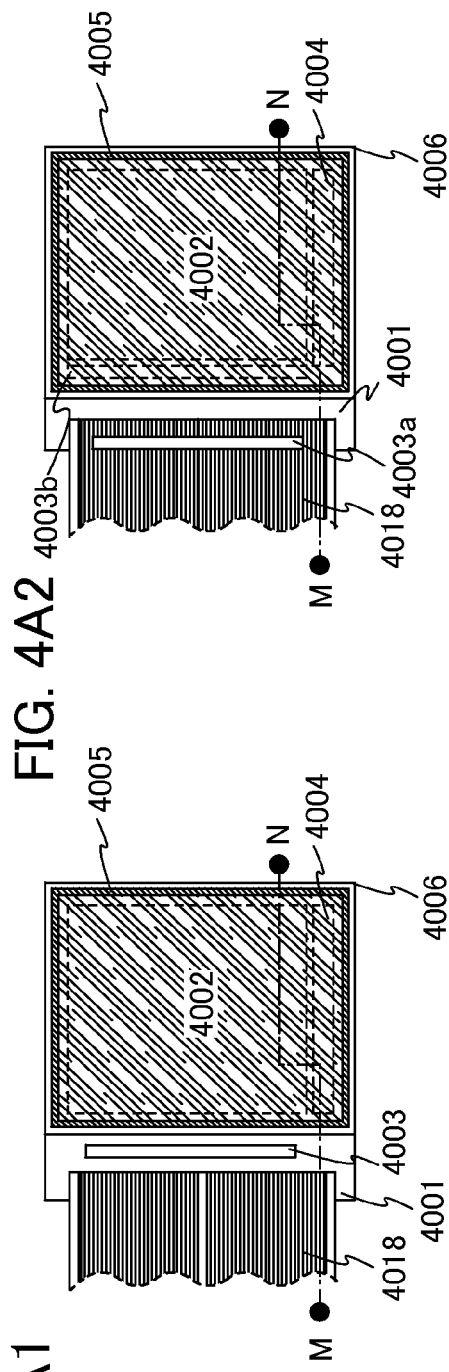
Figure 4B:
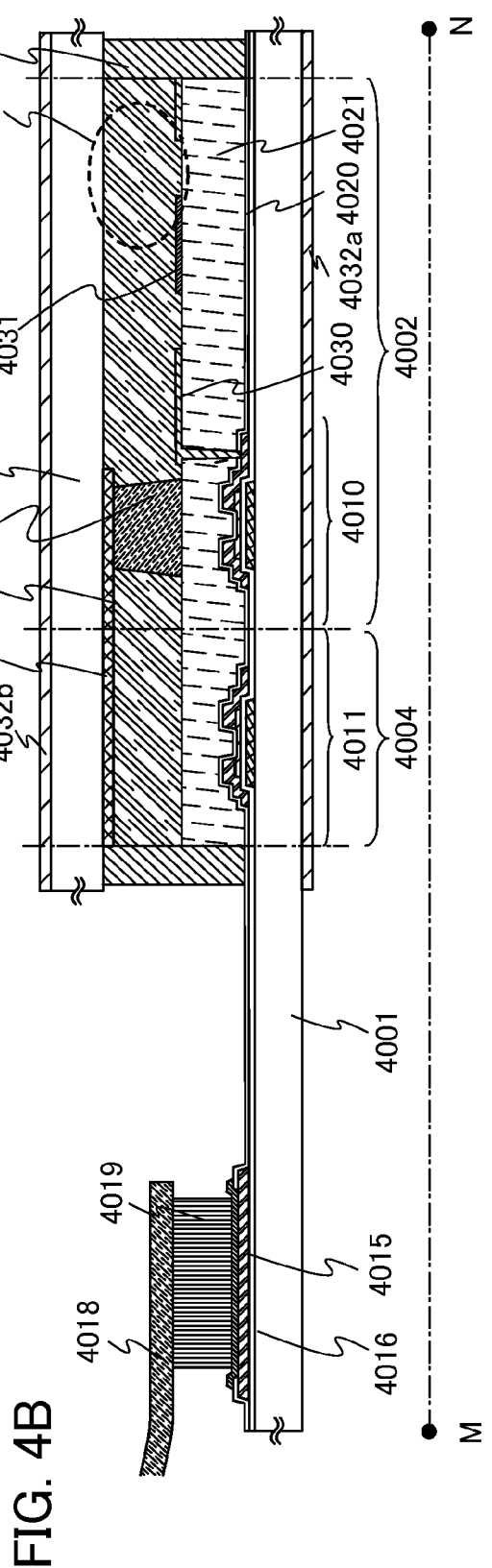

The appearance and a cross section of a liquid crystal display panel which corresponds to a liquid crystal display device of one embodiment of the present invention is described with reference to FIGS. 4-A1 and 4A-2 and 4B. FIGS. 4-A1 and 4A-2 are top views of a panel in which transistors 4010 and 4011 and a liquid crystal element 4013 which are formed over a first substrate 4001 are sealed between the first substrate 4001 and a second substrate 4006 with a sealant 4005. FIG. 4B is a cross-sectional view taken along M-N of FIGS. 4A-1 and 4A-2.

The sealant 4005 is provided so as to surround a pixel portion 4002 and a scan line driver circuit 4004 which are provided over the first substrate 4001. The second substrate 4006 is provided over the pixel portion 4002 and the scan line driver circuit 4004. Therefore, the pixel portion 4002 and the scan-line driver circuit 4004 are sealed together with a liquid crystal layer 4008, by the first substrate 4001, the sealant 4005, and the second substrate 4006.

In FIG. 4A-1, a signal line driver circuit 4003 that is formed using a single-crystal semiconductor film or a polycrystalline semiconductor film over a substrate separately prepared is mounted in a region that is different from the region surrounded by the sealant 4005 over the first substrate 4001. FIG. 4A-2 illustrates an example in which part of a signal line driver circuit is formed with use of a transistor which is provided over the first substrate 4001. A signal line driver circuit 4003b is formed over the first substrate 4001 and a signal line driver circuit 4003a which is formed using a single crystal semiconductor film or a polycrystalline semiconductor film is mounted on a substrate separately prepared.

Note that the connection method of the driver circuit which is separately formed is not particularly limited, and a COG method, a wire bonding method, a TAB method, or the like can be used. FIG. 4A-1 illustrates an example of mounting the signal line driver circuit 4003 by a COG method, and FIG. 4A-2 illustrates an example of mounting the signal line driver circuit 4003 by a TAB method.

The pixel portion 4002 and the scan line driver circuit 4004 provided over the first substrate 4001 include a plurality of transistors. FIG. 4B illustrates the transistor 4010 included in the pixel portion 4002 and the transistor 4011 included in the scan line driver circuit 4004, as an example. An insulating layer 4020 and an interlayer film 4021 are provided over the transistors 4010 and 4011.

As the transistors 4010 and 4011, transistors with a known structure can be used.

Further, a conductive layer may be provided over the interlayer film 4021 or the insulating layer 4020 so as to overlap with a channel formation region of a semiconductor layer of the transistor 4011 for the driver circuit. The conductive layer may have a potential the same as or a potential different from that of a gate electrode layer of the transistor 4011 and can function as a second gate electrode layer. The potential of the conductive layer may be GND, 0 V, or in a floating state.

A pixel electrode layer 4030 and a common electrode layer 4031 are formed over the interlayer film 4021, and the pixel electrode layer 4030 is electrically connected to the transistor 4010. The liquid crystal element 4013 includes the pixel electrode layer 4030, the common electrode layer 4031, and the liquid crystal layer 4008. Note that a polarizing plate 4032a is provided on the outer side of the first substrate 4001 and a polarizing plate 4032b is provided on the outer side of the second substrate 4006.

The liquid crystal composition described in Embodiment 1 is applied to the liquid crystal layer 4008.

By an electric field generated between the pixel electrode layer 4030 and the common electrode layer 4031, liquid crystal molecules of the liquid crystal layer 4008 are controlled. An electric field in the holizontal direction is generated in the liquid crystal layer 4008, and the liquid crystal molecules are controlled with the electric field. The liquid crystal composition described in Embodiment 1 becomes a polymer/liquid crystal composite through the polymer stabilization treatment (polymerization treatment). The liquid crystal included in the polymer/liquid crystal composite is aligned so as to exhibit a blue phase and can be controlled in the direction parallel to the substrate; thus, a wide viewing angle can be obtained.

As the first substrate 4001 and the second substrate 4006, glass, plastic, or the like having a light-transmitting property can be used. As plastic, a fiberglass-reinforced plastics (FRP) plate, a polyvinyl fluoride (PVF) film, a polyester film, or an acrylic resin film can be used. Alternatively, a sheet with a structure in which an aluminum foil is sandwiched between PVF films or polyester films can be used.

A columnar spacer 4035 is obtained by selective etching of an insulating layer and is provided in order to control the thickness of the liquid crystal layer 4008 (a cell gap). Alternatively, a spherical spacer may be used. In the liquid crystal display device, the cell gap which is the thickness of the liquid crystal layer 4008 is preferably greater than or equal to 1 μm and less than or equal to 20 μm. In this specification, the thickness of the cell gap refers to the maximum thickness (film thickness) of the liquid crystal layer 4008.

Although FIGS. 4A-1, 4A-2 and 4B illustrate a transmissive liquid crystal display device, the liquid crystal display device in the present invention may be a semi-transmissive liquid crystal display device or a reflective liquid crystal display device.

FIGS. 4A-1, 4A-2, and 4B illustrate an example in which the polarizing plate is provided on the outer side (the viewing side) of the substrate; however, the polarizing plate may be provided on the inner side of the substrate. The position of the polarizing plate may be determined as appropriate depending on the material of the polarizing plate and conditions of the manufacturing process. Further, a light-blocking layer serving as a black matrix may be provided.

A color filter layer or a light-blocking layer may be formed as part of the interlayer film 4021. In FIGS. 4A-1, 4A-2, and 4B, a light-blocking layer 4034 is provided on the second substrate 4006 to overlap with the transistors 4010 and 4011. With the light-blocking layer 4034, improvement in contrast and stabilization of the transistors can be achieved.

The insulating layer 4020 may be provided so as to function as a protective film of the transistors; however, this embodiment is not particularly limited thereto. In that case, the protective film refers to a film provided to prevent entry of impurities floating in air, such as an organic substance, a metal substance, or moisture, and is preferably a dense film. The protective film may be formed by a sputtering method to have a single-layer structure or a stacked structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

In the case where a light-transmitting insulating layer is further formed as a planarizing insulating film, an organic material having heat resistance such as polyimide, acrylic, benzocyclobutene, polyamide, or epoxy can be used. In addition to such organic materials, a low-dielectric constant material (a low-k material), a siloxane-based resin, PSG (phosphosilicate glass), BPSG (borophosphosilicate glass), or the like can be used. Note that the insulating layer may be formed by stacking a plurality of insulating films formed using these materials.

There is no particular limitation on the method for forming the stacked insulating layers, and the following method can be employed depending on the material: sputtering, spin coating, dip coating, spray coating, droplet discharging (such as ink jetting, screen printing, or offset printing), roll coating, curtain coating, knife coating, or the like.

The pixel electrode layer 4030 and the common electrode layer 4031 can be formed using a light-transmitting conductive material such as an indium oxide containing a tungsten oxide, an indium zinc oxide containing a tungsten oxide, an indium oxide containing a titanium oxide, an indium tin oxide containing a titanium oxide, an indium tin oxide (hereinafter referred to as ITO), an indium zinc oxide, or an indium tin oxide to which a silicon oxide is added. Alternatively, the pixel electrode layer 4030 and the common electrode layer 4031 can be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy containing any of these metals; and a nitride of these metals.

Alternatively, the pixel electrode layer 4030 and the common electrode layer 4031 can be formed using a conductive composition including a conductive high molecule (also referred to as a conductive polymer).

Further, a variety of signals and potentials are supplied from an FPC 4018 to the signal line driver circuit 4003 which is formed separately, and the scan line driver circuit 4004 or the pixel portion 4002.

Since the transistor is easily broken by static electricity and the like, a protection circuit for protecting the driver circuits is preferably provided over the same substrate as a gate line or a source line. The protection circuit is preferably formed using a nonlinear element.

In FIGS. 4A-1, 4A-2, and 4B, a connection terminal electrode 4015 is formed using the same conductive film as that of the pixel electrode layer 4030, and a terminal electrode 4016 is formed using the same conductive film as that of source and drain electrode layers of the transistors 4010 and 4011. The connection terminal electrode 4015 is electrically connected to a terminal of the FPC 4018 through an anisotropic conductive film 4019.

Note that FIGS. 4A-1, 4A-2 and 4B illustrate the example in which the signal line driver circuit 4003 is formed separately and mounted on the first substrate 4001; however, this embodiment is not limited to this structure. The scan line driver circuit may be separately formed and then mounted, or only part of the signal line driver circuit or part of the scan line driver circuit may be separately formed and then mounted.

In the liquid crystal display device of this embodiment, with use of the liquid crystal composition that is one embodiment of the present invention, the temperature range of polymer stabilization treatment for obtaining the polymer/liquid crystal composite with a wider blue phase appearance temperature range can be widened. As the result, defects of a panel of the liquid crystal display device can be reduced, so that the yield of the liquid crystal display device can be improved. The use of the liquid crystal composition which is one embodiment of the present invention can also decrease the driving voltage of the liquid crystal element, which leads to decrease in driving voltage of the liquid crystal display device.

In the liquid crystal display device of this embodiment, the polymer/liquid crystal composite can exhibit the polymer-stabilized blue phase and provide high contrast; thus, a high-definition liquid crystal display device with high visibility can be provided. Further, since the polymer/liquid crystal composite is capable of high-speed response, a liquid crystal display device with higher performance can be achieved.

The structures described in this embodiment can be combined as appropriate with any of the structures described in the other embodiments.

Embodiment 5

The liquid crystal display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game console, a personal digital assistant, an audio reproducing device, a large-sized game machine such as a pachinko machine, and the like.

Figure 5A:
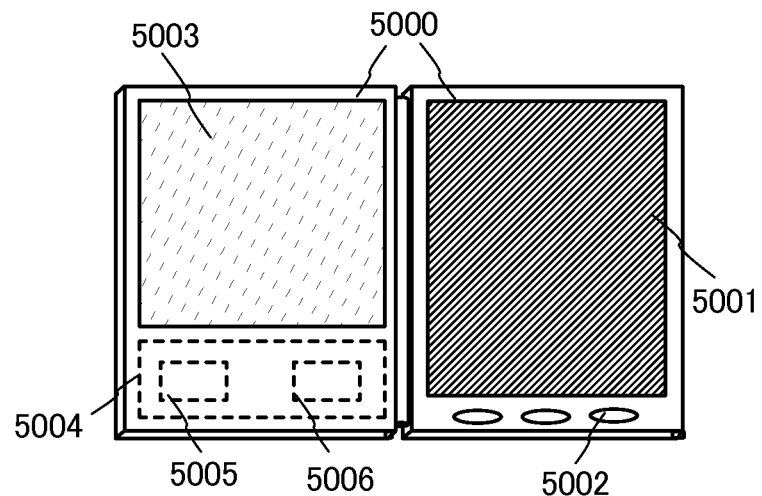
FIGS. 5A and 5B illustrate an application example of a liquid crystal display device.

FIG. 5A illustrates an electronic book reader (also referred to as an e-book) which can include housings 5000, a display portion 5001, operation keys 5002, a solar cell 5003, and a charge and discharge control circuit 5004. The e-book reader illustrated in FIG. 5A has a function of displaying various kinds of information (e.g., a still image, a moving image, and a text image) on the display portion, a function of displaying a calendar, a date, the time, or the like on the display portion, a function of operating or editing the information displayed on the display portion, a function of controlling processing by various kinds of software (programs), and the like. Note that in FIG. 5A, the charge and discharge control circuit 5004 has a battery 5005 and a DCDC converter (hereinafter abbreviated as a converter) 5006 as an example. By application of the liquid crystal display device described in Embodiment 3 or Embodiment 4 to the display portion 5001, an e-book reader which has high contrast and high visibility and is capable of high-speed response, high performance, and low voltage driving can be provided.

In the case of using a transflective or reflective liquid crystal display device for the display portion 5001 in the structure shown in FIG. 5A, the electronic book reader may be used in a comparatively bright environment. In that case, power generation by the solar cell 5003 and charge by the battery 5005 can be effectively performed, which is preferable. Since the solar batt cell 5003 can be provided on a space (a surface or a rear surface) of the housings 5000 as appropriate, the battery 5005 can be efficiently charged, which is preferable. When a lithium ion battery is used as the battery 5005, there is an advantage of downsizing or the like.

Figure 5B:
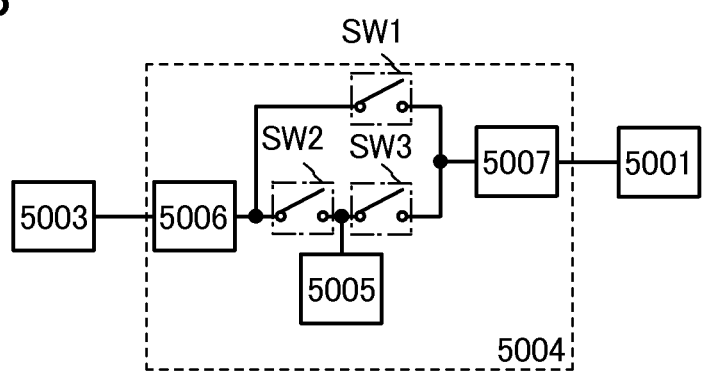

The structure and the operation of the charge and discharge control circuit 5004 shown in FIG. 5A are described with reference to a block diagram in FIG. 5B. The solar cell 5003, the battery 5005, the converter 5006, a converter 5007, switches SW1 to SW3, and the display portion 5001 are shown in FIG. 5B, and the battery 5005, the converter 5006, the converter 5007, and the switches SW1 to SW3 correspond to the charge and discharge control circuit 5004.

Here, an example of operation in the case where power is generated by the solar cell 5003 using external light is described. The voltage of power generated by the solar cell 5003 is raised or lowered by the converter 5006 so that the power has a voltage for charging the battery 5005. When the power from the solar cell 5003 is used for the operation of the display portion 5001, the switch SW1 is turned on and the voltage of the power is raised or lowered by the converter 5007 so as to be a voltage needed for the display portion 5001. In addition, when display on the display portion 5001 is not performed, the switch SW1 is turned off and the switch SW2 is turned on so that the battery 5005 may be charged.

Next, operation in the case where power is not generated by the solar cell 5003 using external light is described. The voltage of power accumulated in the battery 5005 is raised or lowered by the converter 5007 by turning on the switch SW3. Then, power from the battery 5005 is used for the operation of the display portion 5001.

Note that although the solar cell 5003 is described as an example of a means for charge, the battery 5005 may be charged by another means. In addition, a combination of the solar cell 5003 and another means for charge may be used.

Figure 6A:
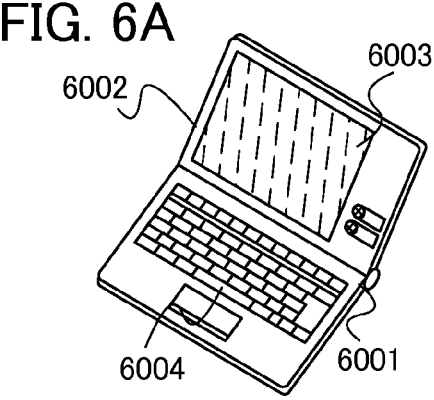
FIGS. 6A to 6F illustrate application examples of liquid crystal display devices.

FIG. 6A shows a laptop personal computer, which includes a main body 6001, a housing 6002, a display portion 6003, a keyboard 6004, and the like. The liquid crystal display device described in Embodiment 3 or Embodiment 4 is applied to the display portion 6003, whereby a laptop personal computer which has high contrast and high visibility and is capable of high-speed response, high performance, and low voltage driving can be provided.

Figure 6B:
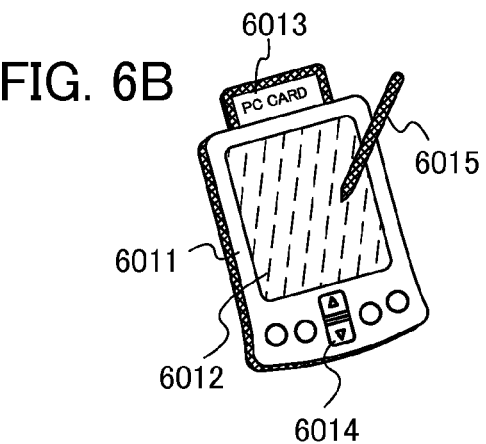

FIG. 6B illustrates a personal digital assistant (PDA) including a display portion 6012, an external interface 6013, an operation button 6014, and the like in a main body 6011. A stylus 6015 is included as an accessory for operation. The liquid crystal display device described in Embodiment 3 or Embodiment 4 is applied to the display portion 6012, whereby a personal digital assistant (PDA) which has high contrast and high visibility and is capable of high-speed response, high performance, and low voltage driving can be provided.

Figure 6C:
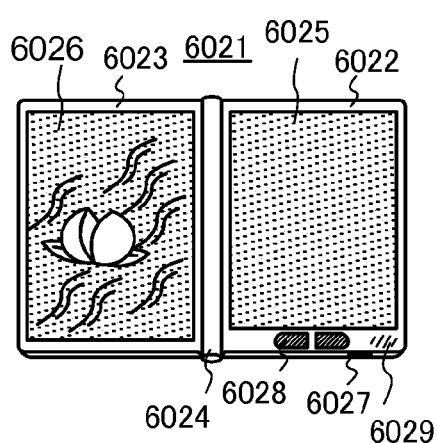

FIG. 6C illustrates an example of an e-book reader. For example, the e-book reader 6021 includes two housings, a housing 6022 and a housing 6023. The housing 6022 and the housing 6023 are combined with a hinge 6024 so that the e-book reader 6021 can be opened and closed with the hinge 6024 as an axis. With such a structure, the e-book reader 6021 can operate like a paper book.

A display portion 6025 and a display portion 6026 are incorporated in the housing 6022 and the housing 6023, respectively. The display portion 6025 and the display portion 6026 may display one image or different images. In the structure where different images are displayed in different display portions, for example, the right display portion (the display portion 6025 in FIG. 6C) can display text and the left display portion (the display portion 6026 in FIG. 6C) can display images. When the liquid crystal display device described in Embodiment 3 or Embodiment 4 is applied to the display portions 6025 and 6026, the e-book reader 6021 which has high contrast and high visibility and is capable of high-speed response, high performance, and low voltage driving can be obtained.

FIG. 6C illustrates an example in which the housing 6022 is provided with an operation portion and the like. For example, the housing 6022 is provided with a power switch 6027, operation keys 6028, a speaker 6029, and the like. With the operation keys 6028, pages can be turned. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the back surface or the side surface of the housing. Moreover, the e-book reader 6021 may have a function of an electronic dictionary.

The e-book reader 6021 may have a structure capable of wirelessly transmitting and receiving data. Through wireless communication, desired book data or the like can be purchased and downloaded from an electronic book server.

Figure 6D:
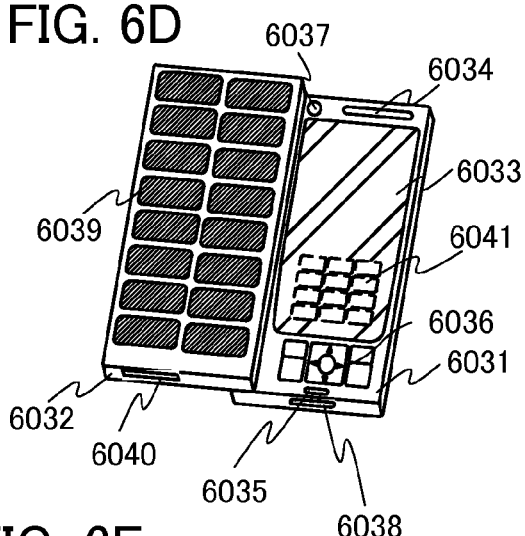

FIG. 6D illustrates a mobile phone, which includes two housings, a housing 6031 and a housing 6032. The housing 6031 includes a display panel 6033, a speaker 6034, a microphone 6035, a pointing device 6036, a camera lens 6037, an external connection terminal 6038, and the like. In addition, the housing 6032 includes a solar cell 6039 having a function of charge of the personal digital assistant, an external memory slot 6040, and the like. Further, an antenna is incorporated in the housing 6031. The liquid crystal display device described in Embodiment 3 or Embodiment 4 is applied to the display panel 6033, whereby a mobile phone which has high contrast and high visibility and is capable of high-speed response, high performance, and low voltage driving can be provided.

The display panel 6033 is provided with a touch panel. A plurality of operation keys 6041 which is displayed as images is illustrated by dashed lines in FIG. 6D. Note that a boosting circuit by which a voltage output from the solar cell 6039 is increased to be sufficiently high for each circuit is also included.

The display direction of the display panel 6033 can be appropriately changed depending on a usage pattern. Further, the display device is provided with the camera lens 6037 on the same surface as the display panel 6033, and thus it can be used as a video phone. The speaker 6034 and the microphone 6035 can be used for videophone calls, recording and playing sound, and the like as well as voice calls. Moreover, the housing 6031 and the housing 6032 developed as shown in FIG. 6D can be slid so that one is lapped over the other; thus, the size of the mobile phone can be reduced, which makes the mobile phone suitable for being carried.

The external connection terminal 6038 can be connected to an AC adapter and various types of cables such as a USB cable, and charging and data communication with a personal computer are possible. Moreover, a large amount of data can be stored by inserting a storage medium into the external memory slot 6040 and can be moved.

Further, in addition to the above functions, an infrared communication function, a television reception function, or the like may be provided.

Figure 6E:
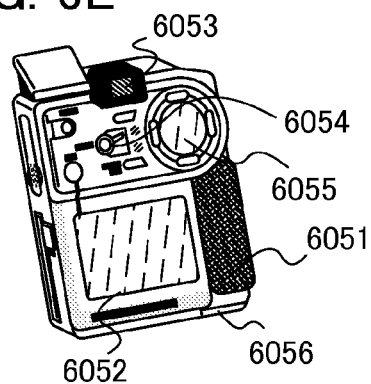

FIG. 6E illustrates a digital video camera which includes a main body 6051, a display portion A 6052, an eyepiece 6053, an operation switch 6054, a display portion B 6055, a battery 6056, and the like. The liquid crystal display device described in Embodiment 3 or Embodiment 4 is applied to the display portion A 6052 and the display portion B 6055, whereby a digital video camera which has high contrast and high visibility and is capable of high-speed response, high performance, and low voltage driving can be provided.

Figure 6F:
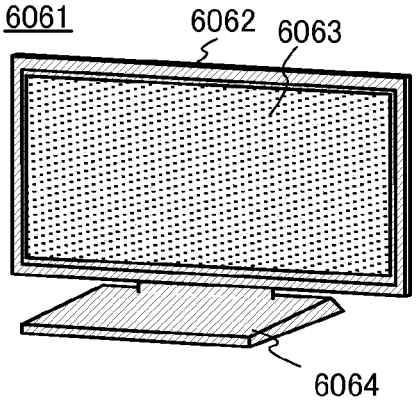

FIG. 6F illustrates an example of a television device. In a television set 6061, a display portion 6063 is incorporated in a housing 6062. The display portion 6063 can display images. Here, the housing 6062 is supported by a stand 6064. When the liquid crystal display device described in Embodiment 3 or Embodiment 4 is applied to the display portion 6063, the television set 6061 which has high contrast and high visibility and is capable of high-speed response, high performance, and low voltage driving can be obtained.

The television set 6061 can be operated by an operation switch of the housing 6062 or a separate remote controller. Further, the remote controller may be provided with a display portion for displaying data which is output from the remote controller.

Note that the television set 6061 is provided with a receiver, a modem, and the like. With use of the receiver, general television broadcasting can be received. Moreover, when the display device is connected to a communication network with or without wires via the modem, one-way (from a sender to a receiver) or two-way (between a sender and a receiver or between receivers) information communication can be performed.

The structures described in this embodiment can be combined as appropriate with any of the structures described in the other embodiments.

Example 1

In this example, ten kinds of liquid crystal compositions were manufactured as liquid crystal compositions each of which is one embodiment of the present invention, and the results of polymer stabilization treatment (polymerization treatment) performed on the liquid crystal compositions are shown.

In the manufacturing of the liquid crystal compositions in this example, as a liquid crystal material exhibiting a blue phase, E-8 (abbreviation) (produced by Merck Ltd., Japan or LCC Corporation), 4-(trans-4-n-propylcyclohexyl)-3',4'-difluoro-1,1'-biphenyl (abbreviation: CPP-3FF), and 4-n-pentylbenzoic acid 4-cyano-3-fluorophenyl ester (abbreviation: PEP-5CNF); as a non-liquid-crystalline monomer, dodecyl methacrylate (abbreviation: DMeAc) (produced by Tokyo Chemical Industry Co., Ltd.); as a polymerization initiator, DMPAP (abbreviation) (produced by Tokyo Chemical Industry Co., Ltd.); as a chiral agent, 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.) were used. As a liquid crystalline monomer, any of ten materials shown in Table 1 was used. Thus, ten kinds of liquid crystal compositions were formed. Note that structural formulae of the above-described substances are shown below.

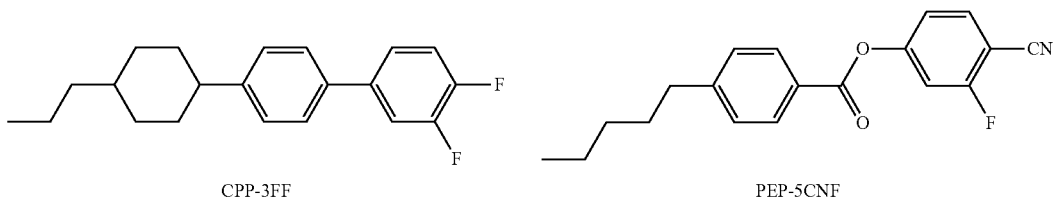

CPP-3FF                PEP-5CNF

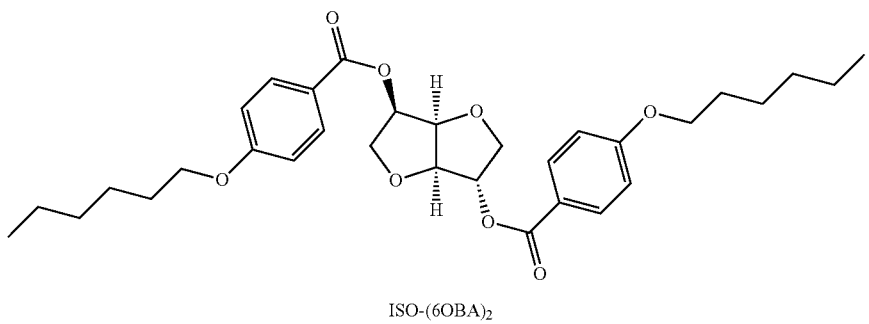

ISO-(6OBA)$_2$

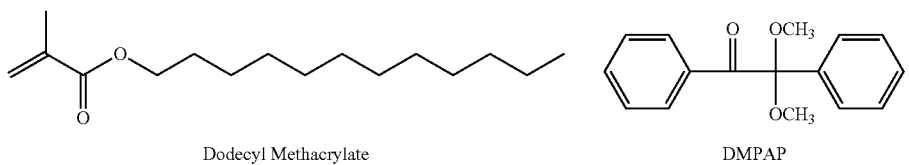

Dodecyl Methacrylate                DMPAP

Further, structures of the liquid crystal compositions formed in this example are shown in Table 1. The mixture ratios are all represented in weight ratios (wt %).

TABLE 1

| Classification | Material | Mixture ratio (wt %) |
|---|---|---|
| liquid crystal material | E-8 | 34.0 |
| | CPP-3FF | 25.5 |
| | PEP-5CNF | 25.5 |
| non-liquid-crystalline monomer | dodecyl methacrylate | 4.0 |
| liquid crystal monomer | RM-O3 | 4.0 |
| | RM-O4 | |
| | RM-O5 | |
| | RM-O6 | |
| | RM-O7 | |
| | RM-O8 | |
| | RM-O9 | |
| | RM-O10 | |
| | RM-O11 | |
| | RM-O12 | |
| polymerization initiator | DMPAP | small amount |
| chiral agent | ISO-(6OBA)2 | 6.9 |
| Total | | 100.0 |

In this example, a liquid crystal cell was manufactured by providing a liquid crystal composition between a pair of glass substrates and sealing with a sealant in order to perform polymer stabilization treatment of the liquid crystal composition. Note that liquid crystal monomers used for liquid crystal cells (liquid crystal cell 1 to liquid crystal cell 10) are shown in Table 2.

TABLE 2

| | Liquid crystal monomer | Chain Length of Alkylene group (O and/or C) |
|---|---|---|
| liquid crystal cell 1 | RM-O3 | 4 |
| liquid crystal cell 2 | RM-O4 | 5 |
| liquid crystal cell 3 | RM-O5 | 6 |
| liquid crystal cell 4 | RM-O6 | 7 |
| liquid crystal cell 5 | RM-O7 | 8 |
| liquid crystal cell 6 | RM-O8 | 9 |
| liquid crystal cell 7 | RM-O9 | 10 |
| liquid crystal cell 8 | RM-O10 | 11 |
| liquid crystal cell 9 | RM-O11 | 12 |
| liquid crystal cell 10 | RM-O12 | 13 |

In the formation of each of the liquid crystal cells 1 to 10, a pair of glass substrates was bonded to each other with a sealant so that a space (4 μm) was formed between the substrates, and then the liquid crystal composition formed with the mixture ratio shown in Table 1 was injected between the substrates by an injection method.

Note that an ultraviolet and heat curable sealant was used as a sealant. As curing treatment, an ultraviolet light irradiation treatment (irradiance: 100 mW/cm$^2$) was performed for 90 seconds, and then, heat treatment was performed at 120° C. for an hour.

Next, polymer stabilization evaluation of the liquid crystal cells was performed. For the polymer stabilization evaluation, a polarizing microscope (MX-50 produced by Olympus Corporation) and a temperature controller (MK1000 produced by Instec, Inc.) were used.

The polymer stabilization treatment was performed as follows. The liquid crystal composition in the liquid crystal cell was heated to a temperature at which an isotropic phase appears, and then the temperature was decreased to a given temperature as a constant temperature. Then ultraviolet light irradiation (wavelength: 365 nm, irradiance: 11 mW/cm$^2$) was performed for six minutes. Note that as for a given temperature during the UV light irradiation, the evaluation was performed in increments of 1° C.

The measurement was performed with the polarizing microscope under the following conditions: a measurement mode is a reflective mode; polarizers are disposed in crossed nicols; the magnification is 200 times; and the temperature is room temperature.

Figure 10:
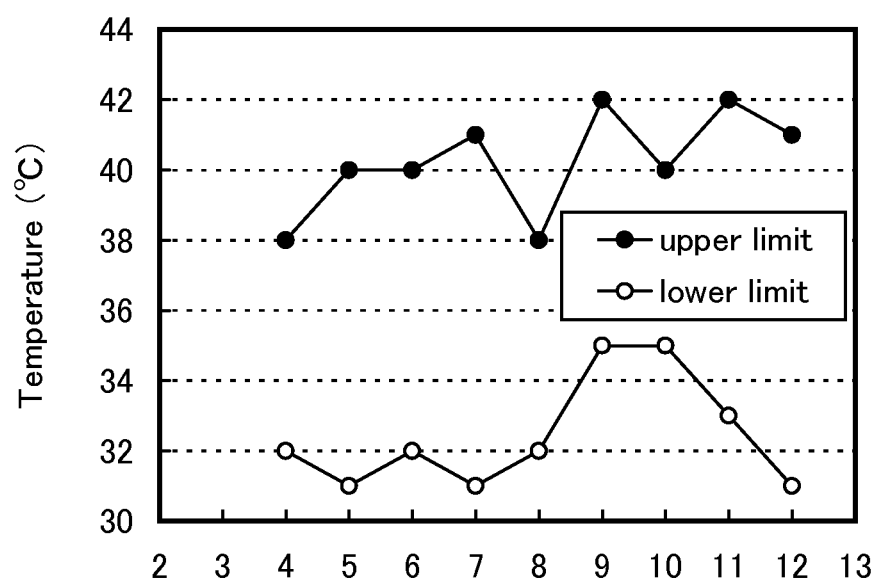
FIG. 10 shows a temperature range where polymer stabilization treatment described in Example 1 can be performed.

FIG. 10 shows upper limits and lower limits of the temperature where the polymer stabilization treatment (here, polymerization treatment by UV light irradiation) for obtaining the polymer/liquid crystal composite with a wide temperature range where a polymer-stabilized blue phase appears can be performed.

From the results shown in FIG. 10, it is found that when a liquid crystalline monomer including a mesogenic skeleton has an alkylene group with a certain chain length (the sum of oxygen atoms and/or carbon atoms), the temperature range where polymer stabilization treatment (here, polymerization treatment by UV light irradiation) can be performed can be extended as compared with a normal liquid crystalline monomer.

Therefore, as for the liquid crystalline monomer including a mesogenic skeleton, it is preferable that the chain length of an alkylene group (the sum of oxygen atoms and/or carbon atoms) be 20 or less for extending the temperature range where polymer stabilization treatment (here, polymerization treatment by UV light irradiation) can be performed. It is further preferable that the chain length of an alkylene group (the sum of oxygen atoms and/or carbon atoms) be 12 or less.

From the results shown in FIG. 10, in the case of using a liquid crystalline monomer in which the chain length of an alkylene group (the sum of oxygen atoms and/or carbon atoms) is an odd number, the temperature range where polymer stabilization treatment can be performed (the range between the upper limit and the lower limit) is likely to be extended. In particular, in the case of using a liquid crystalline monomer in which the chain length of an alkylene group (the sum of oxygen atoms and/or carbon atoms) is 7, the temperature range where polymer stabilization treatment can be performed can be wide as compared with the case of using a liquid crystalline monomer in which the chain length of an alkylene group (the sum of oxygen atoms and/or carbon atoms) is 6 or 8.

Specifically, in the case of using a liquid crystalline monomer in which an alkylene group whose channel length (the sum of oxygen atoms and/or carbon atoms) is an odd number (particularly preferably 7) is bonded to each of ends of the mesogenic skeleton of this example, and an end group of the alkylene group is an acryloyl group, it is possible to extend the temperature range where polymer stabilization treatment for obtaining the polymer/liquid crystal composite with a wider blue phase appearance temperature range can be performed.

In general, as for a polymer-stabilized blue phase, a factor extending the blue phase appearance temperature range is that in a process of polymer stabilization treatment (polymerization treatment) of a monomer by UV light irradiation, phase separation occurs between a liquid crystal material and a polymer obtained by the polymerization, and the polymer is concentrated (polymerized) in a disclination region of the blue phase.

Therefore, in this example, in the case of using a liquid crystal composition including the liquid crystalline monomer including a mesogenic skeleton in which an alkylene group whose channel length is an odd number (particularly preferably 7) is bonded to each of ends of the mesogenic skeleton of this example, and an end group of the alkylene group is an acryloyl group, phase separation between a liquid crystal material and a polymer is performed more efficiently; thus, the treatment temperature range where polymer stabilization treatment can be performed is extended.

Figure 13A:
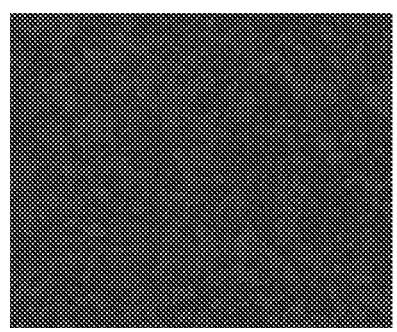
FIGS. 13A to 13D are photpgraphs of orientation states of liquid crystal elements formed in Example 1.
Figure 13B:
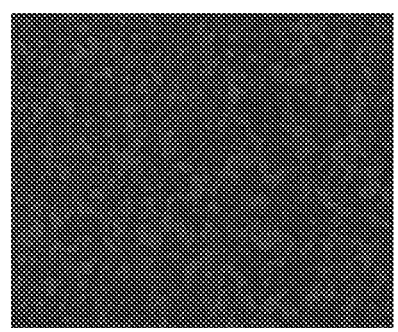
Figure 13C:
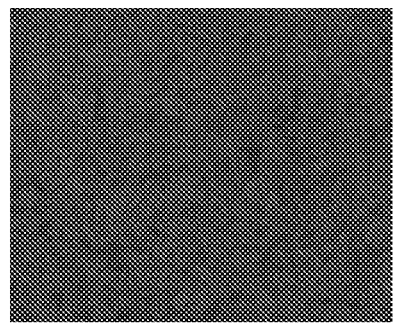
Figure 13D:
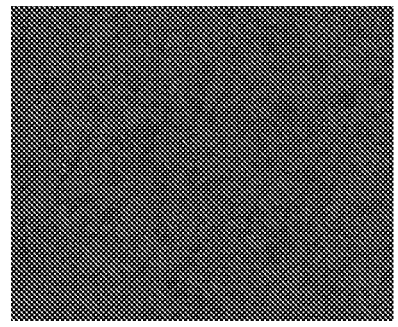

FIGS. 13A to 13D show orientation states when a polymer-stabilized blue phase appears in the case of using the liquid crystalline monomer including a mesogenic skeleton of this example. The case where the chain length of an alkylene group (the sum of oxygen atoms and/or carbon atoms) is an odd number and the case where the chain length of an alkylene group is an even number are shown. Note that FIG. 13A shows the case where the chain length of an alkylene group (the sum of oxygen atoms and/or carbon atoms) of the liquid crystalline monomer is 4, FIG. 13B shows the case where the chain length of an alkylene group is 6, FIG. 13C shows the case where the chain length of an alkylene group is 5, and FIG. 13D shows the case where the chain length of an alkylene group is 7.

According to the results, a platelet state is seen in the case where the chain length of an alkylene group (the sum of oxygen atoms and/or carbon atoms) of the liquid crystalline monomer is 4 or 6 which is an even number, and a platelet state is not seen in the case where the chain length of an alkylene group (the sum of oxygen atoms and/or carbon atoms) of the liquid crystalline monomer is 5 or 7 which is an odd number.

From the results of this example, it is found that with use of the liquid crystal composition that is one embodiment of the present invention, the temperature range of polymer stabilization treatment for obtaining the polymer/liquid crystal composite with a wider blue phase appearance temperature range can be widened.

Note that as for a liquid crystal composition that can exhibit a polymer-stabilized blue phase, extension of the temperature range where polymer stabilization treatment can be performed is very effective when it is difficult to control the temperature at which UV light irradiation is performed for manufacturing a large-area liquid crystal display device or the like.

Example 2

In this example, a synthesis method of 1,4-bis[4-(7-acryloyloxy-n-heptyl-1-oxy)benzoyloxy]-2-methylbenzene (abbreviation: RM-O7), which is a liquid crystalline monomer included in the liquid crystal composition that is one embodiment of the present invention, and represented by the structural formula (105) in Embodiment 1, is described in detail.

Step 1: Synthesis of 4-(7-hydroxy-n-heptyl-1-oxy)benzoic acid ethyl ester

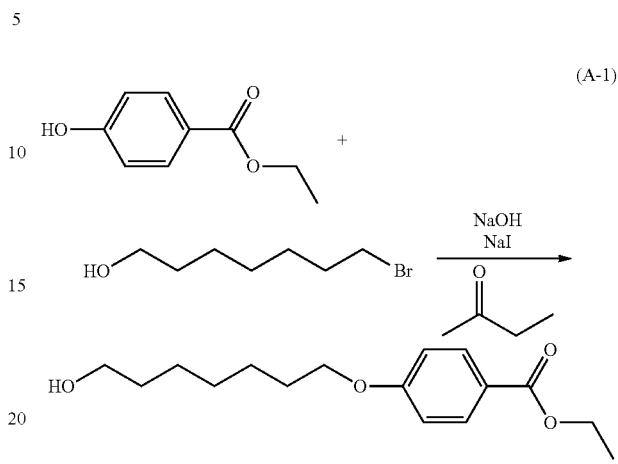

(A-1)

In a 200 mL, recovery flask were put 3.5 g (21 mmol) of 4-hydroxybenzoic acid ethyl ester, 4.9 g (25 mmol) of 7-bromo-1-heptanol, 1.0 g (25 mol) of sodium hydroxide, 3.2 g (21 mmol) of sodium iodide, and 120 mL, of 2-butanone, and the mixture was stirred at 60° C. for 11 hours under a nitrogen stream. Then, completion of the reaction was confirmed using TLC and after that, the obtained mixture was gravity filtered and the residue was dissolved in water. Thus obtained solution was extracted three times, and the extracted solution and the filtrate were mixed and dried with magnesium sulfate. The mixture was gravity filtered, and the obtained filtrate was concentrated to give a white solid.

The obtained solid was purified by silica gel column chromatography (a developing solvent of 1000 mL, ethyl acetate:hexane=1:2). The obtained fractions including a target substance were concentrated, so that 5.0 g of a colorless oily substance was obtained in a yield of 85%.

Step 2: Synthesis of 4-(7-hydroxy-n-heptyl-1-oxy)benzoic acid

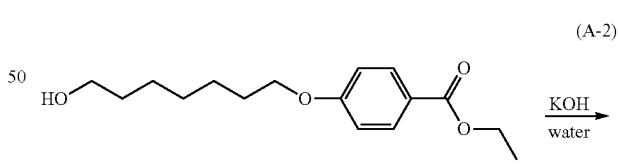

(A-2)

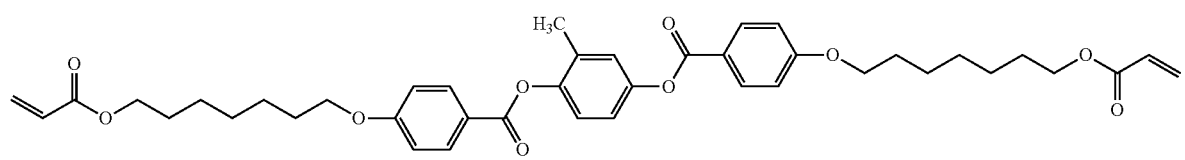

(105)

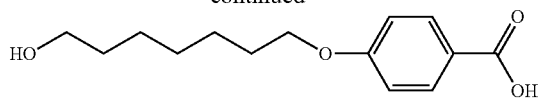

In a 500 mL recovery flask were put 5.0 g (18 mmol) of 4-(7-hydroxy-n-heptyl-1-oxy)benzoic acid ethyl ester and 150 mL of a potassium hydroxide aqueous solution (0.5 mol/L), and the mixture was stirred at 100° C. for 10 hours under a nitrogen stream. Then, completion of the reaction was confirmed using TLC. Into the obtained solution, diethyl ether and dilute hydrochloric acid were added, and an aqueous layer was subjected to extraction three times with diethyl ether. An organic layer and the extracted solution were mixed and dried with magnesium sulfate. The mixture was separated by gravity filtration, and the filtrate was concentrated to give 3.3 g of a pale yellow solid that was a target substance in a crude yield of 73%.

Step 3: Synthesis of 4-(7-acryloyloxy-n-heptyl-1-oxy)benzoic acid

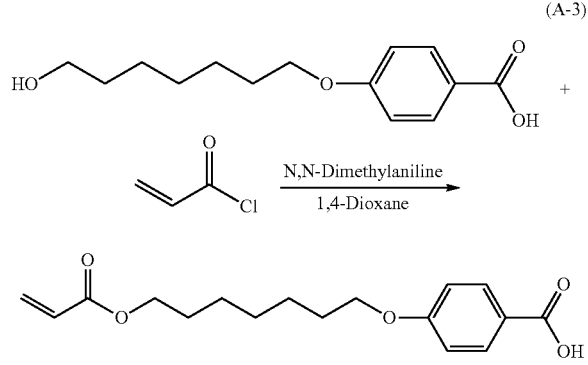

In a 500 mL recovery flask were put 3.3 g (13 mmol) of 4-(7-hydroxy-n-heptyl-1-oxy)benzoic acid, 100 mL of 1,4-dioxane, and 1.9 g (16 mmol) of N,N-dimethylaniline, and the mixture was stirred. Into the solution, 1.4 g (15 mmol) of acryloyl chloride was slowly added, and then the solution was stirred at 60° C. for four hours under a nitrogen stream. Then, completion of the reaction was confirmed using TLC. The obtained solution was slowly added into about 800 mL of water, so that a white solid was precipitated. The white solid was collected by suction filtration and dried to give 3.5 g of a white solid that was a target substance in a crude yield of 88%.

Step 4: Synthesis of 1,4-bis[4-(7-acryloyloxy-n-heptyl-1-oxy)benzoyloxy]-2-methylbenzene (abbreviation: RM-O7)

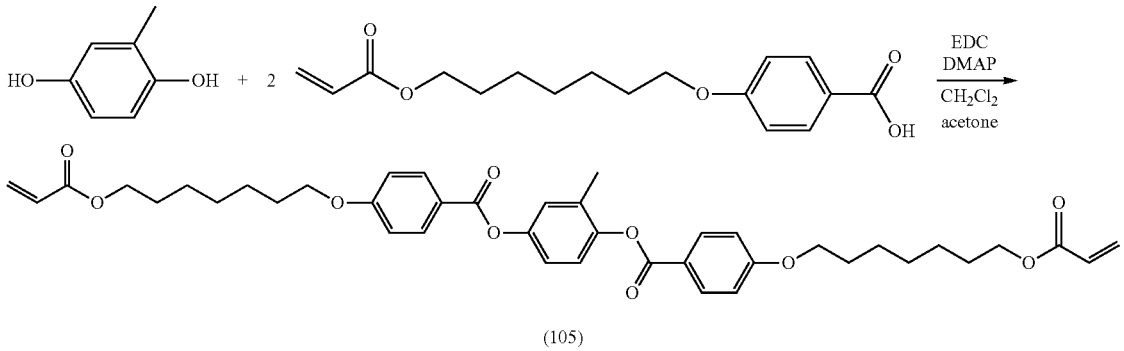

In a 300 mL recovery flask were put 3.5 g (11 mmol) of 4-(7-acryloyloxy-n-heptyl-1-oxy)benzoic acid, 0.71 g (5.7 mmol) of methylhydroquinone, 0.21 g (1.7 mmol) of 4-(N,N-dimethyl)aminopyridine (DMAP), 80 mL of acetone, and 40 mL of dichloromethane, and the mixture was stirred under air. Into this mixture, 2.2 g (11 mmol) of 1-ethyl-3-(3-dimethylaminopropyl)carbodiimide hydrochloride (EDC) was added, so that all the materials were dissolved to give a solution. This solution was stirred at room temperature for 20 hours under air.

After completion of the reaction was confirmed using TLC, about 40 mL of chloroform was added to the solution. This solution was concentrated to about 60 mL, and a saturated aqueous solution of sodium hydrogen carbonate and saturated saline were added to the obtained solution. An aqueous layer of this mixture was extracted with chloroform three times, and the extracted solution was combined with an organic layer and then dried with magnesium sulfate. This mixture was separated by gravity filtration, and the filtrate was concentrated to give an oily substance.

The obtained oily substance was purified by silica gel column chromatography (a developing solvent of 700 mL, ethyl acetate:hexane=1:1). The obtained fractions including a target substance were concentrated, so that a colorless oily substance was obtained. The obtained colorless oily substance was purified by high performance liquid chromatography (abbreviated to HPLC, developing solvent: chloroform), so that 0.38 g of a white solid that is a target substance was obtained in a yield of 14%.

It was confirmed that this compound was 1,4-bis[4-(7-acryloyloxy-n-heptyl-1-oxy)benzoyloxy]-2-methylbenzene (abbreviation: RM-O7) by nuclear magnetic resonance (NMR).

$^1$H NMR data of the obtained compound is shown below.

$^1$H NMR (CDCl$_3$, 300 MHz): δ (ppm)=1.38-1.51 (m, 12H), 1.68-1.86 (m, 8H), 2.24 (s, 3H), 4.05 (t, J=5.4 Hz, 4H), 4.17 (t, J=6.6 Hz, 4H), 5.82 (dd, J1=10 Hz, J2=1.5 Hz, 2H), 6.13 (dd, J1=10 Hz, J2=17 Hz, 2H), 6.41 (dd, J1=1.5 Hz, J2=17 Hz, 2H), 6.95-7.00 (m, 4H), 7.06-7.19 (m, 3H), 8.12-8.18 (m, 4H).

Figure 7:
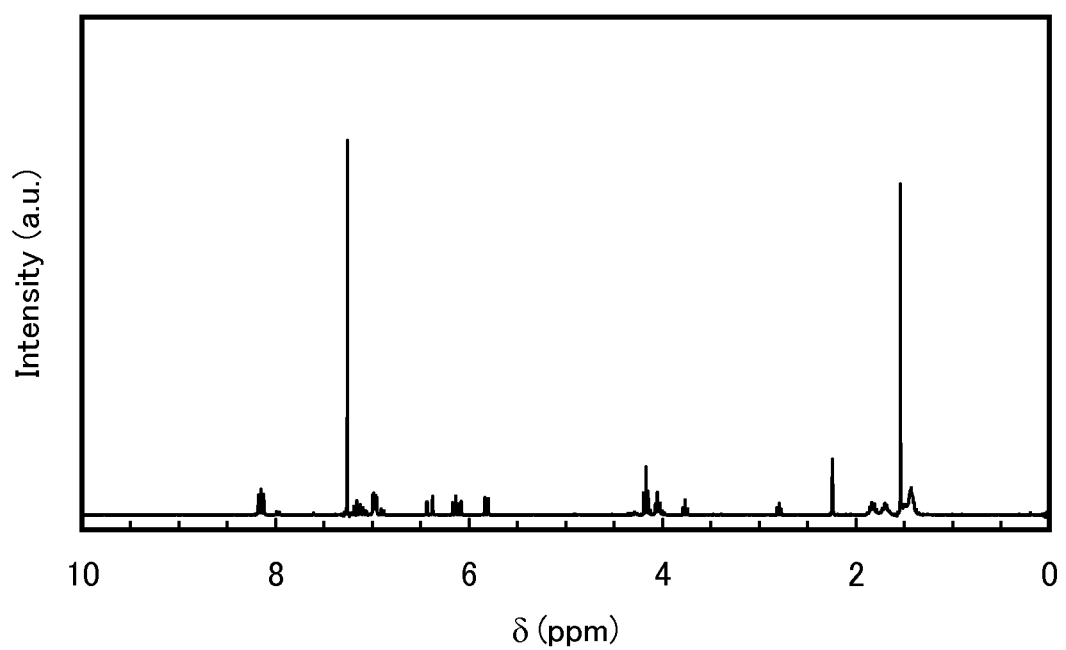
FIG. 7 shows an NMR chart of RM-O7 (abbreviation)
Figure 8A:
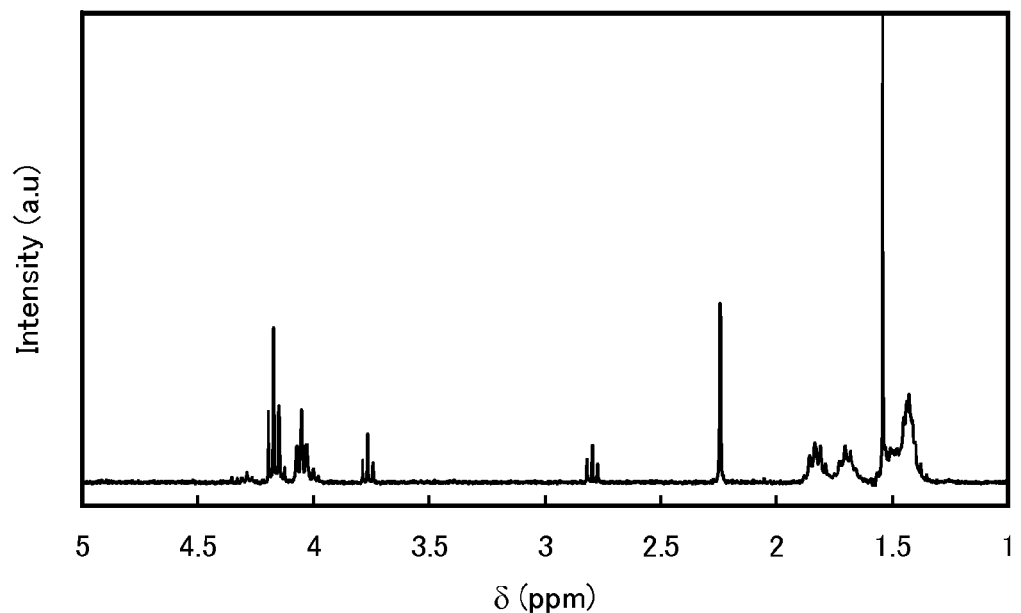
FIGS. 8A and 8B show NMR charts of the RM-O7 (abbreviation)
Figure 8B:
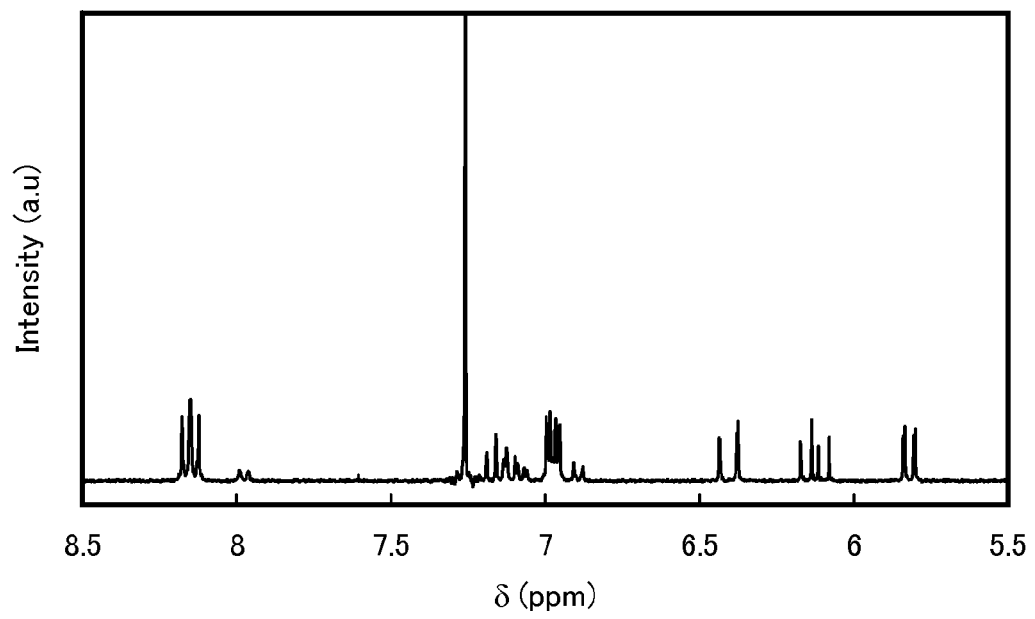

FIG. 7 and FIGS. 8A and 8B show the $^1$H NMR charts. Note that FIG. 8A is a chart obtained by enlarging the range of 1.0 ppm to 5.0 ppm in FIG. 7. FIG. 8B is a chart obtained by enlarging the range of 5.5 ppm to 8.5 ppm in FIG. 7. The measurement results show that 1,4-bis[4-(7-acryloyloxy-n-heptyl-1-oxy)benzoyloxy]-2-methylbenzene (abbreviation: RM-O7) represented by the structural formula (105) was obtained.

Figure 9:
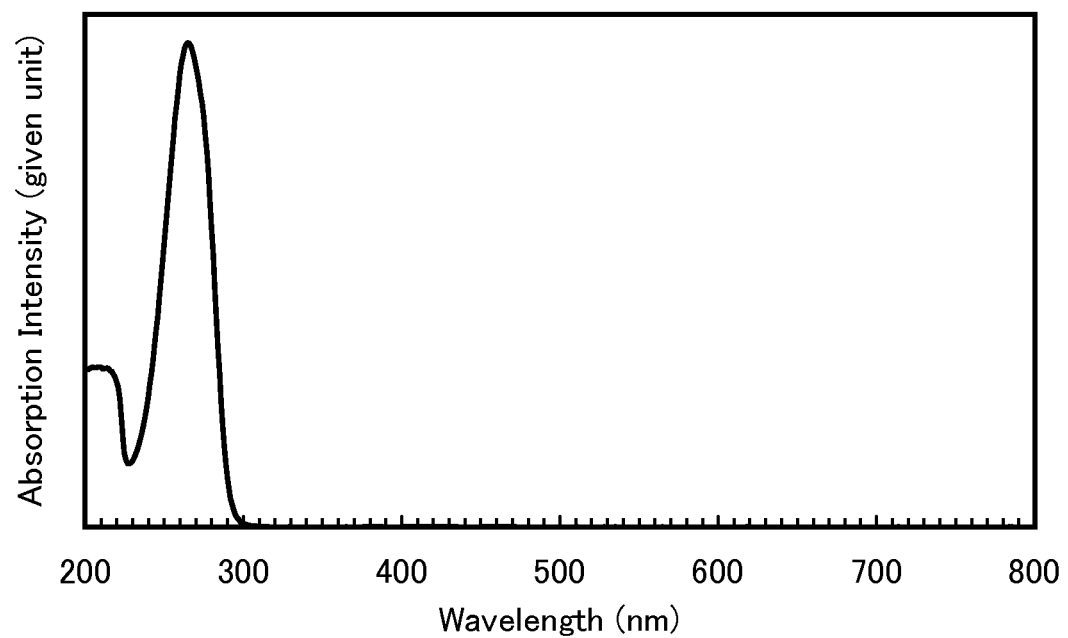
FIG. 9 shows an absorption spectrum of the RM-O7 (abbreviation)

FIG. 9 shows an absorption spectrum of RM-O7 in a dichloromethane solution of RM-O7 (abbreviation). An ultraviolet-visible spectrophotometer (V-550, produced by JASCO Corporation) was used for the measurement. The spectrum of RM-O7 (abbreviation) was obtained as follows: the dichloromethane solution of RM-O7 (abbreviation) was put in a quartz cell and the absorption spectrum thereof was measured, and then the absorption spectra of quartz and dichloromethane were substracted.

In FIG. 9, the horizontal axis indicates wavelength (nm) and the vertical axis indicates absorption intensity (a given unit). In the case of the dichloromethane solution, an absorption peak was observed at around 263 nm.

Note that the syntheses of 1,4-bis[4-(5-acryloyloxy-n-pentyl-1-oxy)benzoyloxy]-2-methylbenzene (abbreviation: RM-O5) and 1,4-bis[4-(11-acryloyloxy-n-undecyl-1-oxy)benzoyloxy]-2-methylbenzene (abbreviation: RM-O11) described in Embodiment 1 were performed using 5-bromo-1-pentanol and 11-bromo-1-undecanol, respectively, instead of 7-bromo-1-heptanol at the step represented by the reaction formula (A-1) in the synthesis of RM-O7 (abbreviation) described in this example. Then, reactions corresponding to the reaction formulae (A-2) to (A-4) were performed, whereby RM-O5 and RM-O11 were obtained.

Further, the syntheses of 1,4-bis[4-(2-methacryloyloxy-ethyl-1-oxy)benzoyloxy]-2-methylbenzene (abbreviation: MeRM-O2) and 1,4-bis[4-(4-acryloyl oxy-n-butyl-1-oxy)benzoyloxy]-2-methylbenzene (abbreviation: RM-O4) described in Embodiment 1 were performed using 4-(2-methacryloyloxy-1-oxy)benzoic acid and 4-(4-acryloyloxy-n-butyl-1-oxy)benzoic acid, respectively, instead of 4-(7-acryloyloxy-n-heptyl-1-oxy)benzoic acid at the step represented by the reaction formula (A-4) in the synthesis of RM-O7 (abbreviation) described in this example.

Example 3

In this example, a liquid crystal element formed using the liquid crystal composition that is one embodiment of the present invention, and the characteristics thereof are described.

In this example, a liquid crystal element 1 was formed using the liquid crystal composition used for the liquid crystal cell 1 in Example 1; a liquid crystal element 2 was formed using the liquid crystal composition used for the liquid crystal cell 2 in Example 1; and a liquid crystal element 4 was formed using the liquid crystal composition used for the liquid crystal cell 4 in Example 1.

In the manufacturing of the liquid crystal element 1, the liquid crystal element 2, and the liquid crystal element 4, a glass substrate over which a pixel electrode layer and a common electrode layer are formed in a comb-like shape was bonded to another glass substrate with a sealant to have a space (4 μm) between the substrates, and then the liquid crystal composition was injected between the substrates by an injection method. The pixel electrode layer and the common electrode layer were formed using indium tin oxide (ITSO) containing silicon oxide by a sputtering method. Note that the thickness was set to 110 nm, the width of the pixel electrode layer, the width of the common electrode layer, and the interval between the pixel electrode layer and the common electrode layer were each set to 2 μm.

Note that an ultraviolet and heat curable sealant was used as a sealant. As curing treatment, an ultraviolet light irradiation treatment (irradiance: 100 mW/cm$^2$) was performed for 90 seconds, and then, heat treatment was performed at 120° C. for an hour.

Next, the polymer stabilization treatment was performed as follows. The liquid crystal composition in the liquid crystal element was heated to a temperature at which an isotropic phase appears, and then the temperature was decreased to a given temperature as a constant temperature. Then ultraviolet light irradiation (wavelength: 365 nm, irradiance: 11 mW/cm$^2$) was performed for six minutes.

The UV light irradiation temperatures of the liquid crystal element 1, the liquid crystal element 2, and the liquid crystal element 4 were set to the respective temperatures at which polymer stabilization of the liquid crystal cell 1, the liquid crystal cell 2, and the liquid crystal cell 4 can be performed in Example 1.

Figure 11:
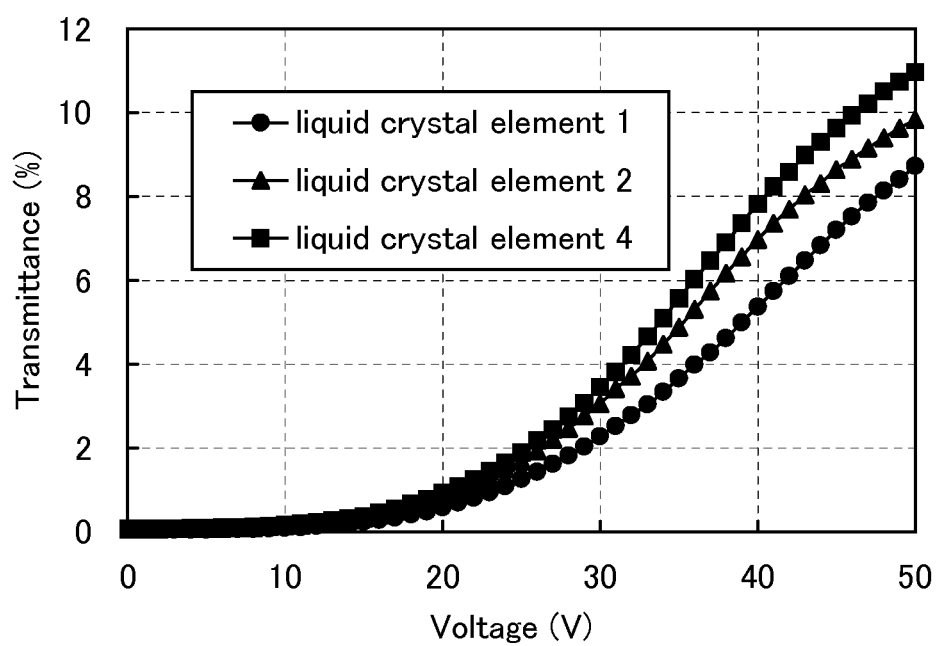
FIG. 11 shows voltage-transmittance characteristics of light-emitting elements described in Example 3.

The voltage-transmittance characteristics of the thus obtained liquid crystal element 1, liquid crystal element 2, and liquid crystal element 4 were measured. FIG. 11 shows the measurement results of the voltage-transmittance characteristics.

Note that the measurement of voltage-transmittance characteristics was performed with use of LCD-7200 (produced by Otsuka Electronics Co., Ltd.) under the conditions where a measurement mode was a transmissive mode; and polarizers were disposed in crossed nicols.

From the results of FIG. 11, it is found that the driving voltage is low with use of a liquid crystalline monomer in which the chain length of an alkylene group (the sum of oxygen atoms and/or carbon atoms) is large.

Accordingly, from the results of this example, it is found that among the liquid crystalline monomers each including a mesogenic skeleton which are each one embodiment of the present invention, with use of a liquid crystalline monomer in which the chain length of an alkylene group (the sum of oxygen atoms and/or carbon atoms) is large, the driving voltage of a liquid crystal element formed using the liquid crystalline monomer can be decreased.

Example 4

In this example, 10 kinds of liquid crystal compositions were manufactured using the liquid crystal material exhibiting a blue phase which is different from that used in Example 1, as liquid crystal compositions of one embodiment of the present invention, and the results of polymer stabilization treatment (polymerization treatment) performed on the liquid crystal compositions are shown.

In the manufacturing of the liquid crystal compositions in this example, as a liquid crystal material exhibiting a blue phase, MDA-00-3506 (abbreviation) (produced by Merck Ltd., Japan), NEDO LC-C (abbreviation) (produced by Merck Ltd., Japan), 4-(trans-4-n-propylcyclohexyl)-3',4'-difluoro-1,1'-biphenyl (abbreviation: CPP-3FF), and 4-n-pentylbenzoic acid 4-cyano-3-fluorophenyl ester (abbreviation: PEP-5CNF); as a non-liquid-crystalline monomer, dodecyl methacrylate (abbreviation: DMeAc) (produced by Tokyo Chemical Industry Co., Ltd.); as a polymerization initiator, DMPAP (abbreviation) (produced by Tokyo Chemical Industry Co., Ltd.); as a chiral agent, 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.) were used. As a liquid crystalline monomer, any of ten materials shown in Table 3 was used. Thus, ten kinds of liquid crystal compositions were formed. Note that structural formulae of the above-described substances are shown below.

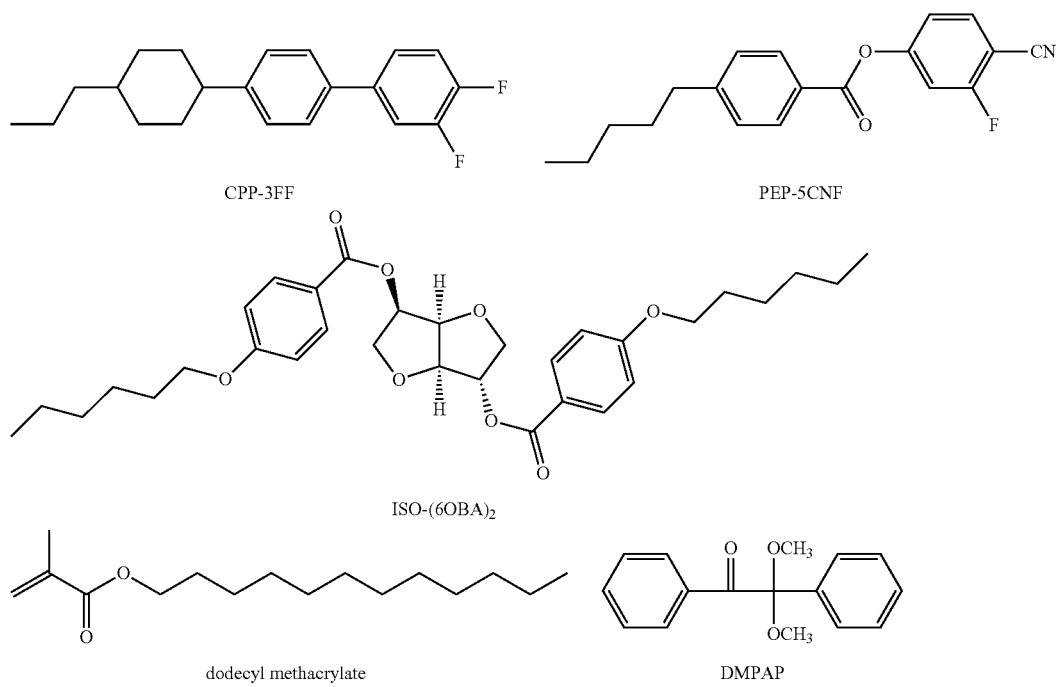

CPP-3FF

PEP-5CNF

ISO-(6OBA)₂ dodecyl methacrylate

DMPAP

Further, structures of the liquid crystal compositions formed in this example are shown in Table 3. The mixture ratios are all represented in weight ratios (wt %).

TABLE 3

| Classification | Material | Mixture ratio (wt %) |
|---|---|---|
| liquid crystal material | MDA | 25.5 |
| | LC-C | 17.0 |
| | CPP-3FF | 17.0 |
| | PEP-5CNF | 25.5 |
| non-liquid-crystalline monomer | dodecyl methacrylate | 4.0 |
| liquid crystal monomer | RM-O3 | 4.0 |
| | RM-O4 | |
| | RM-O5 | |
| | RM-O6 | |
| | RM-O7 | |
| | RM-O8 | |
| | RM-O9 | |
| | RM-O10 | |
| | RM-O11 | |
| | RM-O12 | |
| polymerization initiator | DMPAP | small amount |
| chiral agent | ISO-(6OBA)2 | 6.9 |
| Total | | 100.0 |

In this example, a liquid crystal cell was manufactured by providing a liquid crystal composition between a pair of glass substrates and sealing with a sealant in order to perform polymer stabilization treatment of the liquid crystal composition. Note that liquid crystal monomers used for liquid crystal cells (liquid crystal cell 11 to liquid crystal cell 20) are shown in Table 4.

TABLE 4

| | Liquid crystal monomer | Chain Length of Alkylene group (O and/or C) |
|---|---|---|
| liquid crystal cell 11 | RM-O3 | 4 |
| liquid crystal cell 12 | RM-O4 | 5 |
| liquid crystal cell 13 | RM-O5 | 6 |
| liquid crystal cell 14 | RM-O6 | 7 |
| liquid crystal cell 15 | RM-O7 | 8 |
| liquid crystal cell 16 | RM-O8 | 9 |
| liquid crystal cell 17 | RM-O9 | 10 |
| liquid crystal cell 18 | RM-O10 | 11 |
| liquid crystal cell 19 | RM-O11 | 12 |
| liquid crystal cell 20 | RM-O12 | 13 |

In the formation of each of the liquid crystal cells 11 to 20, a pair of glass substrates was bonded to each other with a sealant so that a space (4 μm) was formed between the substrates, and then the liquid crystal composition formed with the mixture ratio shown in Table 1 was injected between the substrates by an injection method.

Note that an ultraviolet and heat curable sealant was used as a sealant. As curing treatment, an ultraviolet light irradiation treatment (irradiance: 100 mW/cm²) was performed for 90 seconds, and then, heat treatment was performed at 120° C. for an hour.

Next, polymer stabilization evaluation of the liquid crystal cells was performed. For the polymer stabilization evaluation, a polarizing microscope (MX-50 produced by Olympus Corporation) and a temperature controller (MK1000 produced by Instec, Inc.) were used.

The polymer stabilization treatment was performed as follows. The liquid crystal composition in the liquid crystal cell was heated to a temperature at which an isotropic phase appears, and then the temperature was decreased to a given temperature as a constant temperature. Then ultraviolet light irradiation (wavelength: 365 nm, irradiance: 11 mW/cm$^2$) was performed for six minutes. Note that as for a given temperature during the UV light irradiation, the evaluation was performed in increments of 1° C.

The measurement was performed with the polarizing microscope under the following conditions: a measurement mode is a reflective mode; polarizers are disposed in crossed nicols; the magnification is 200 times; and the temperature is room temperature.

Figure 12:
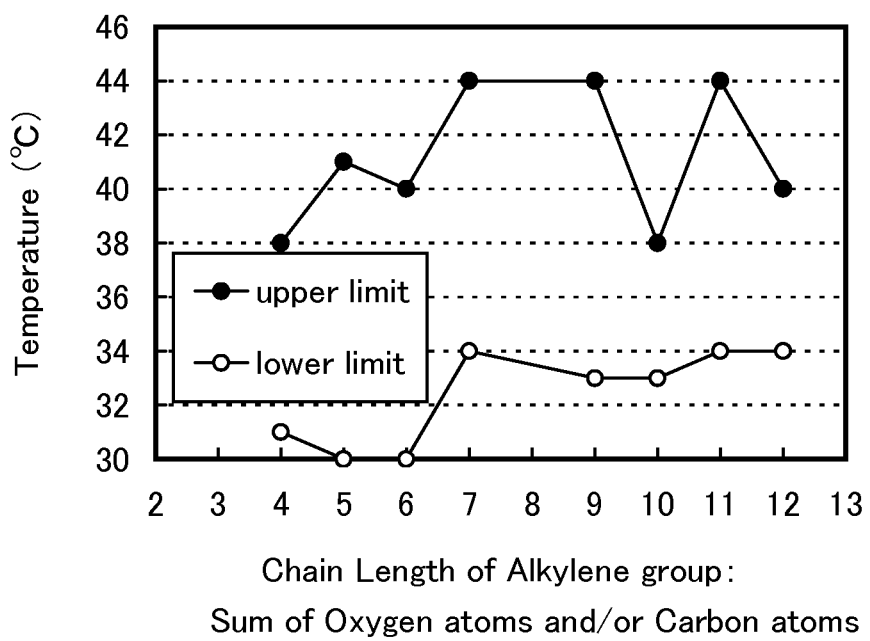
FIG. 12 shows a temperature range where polymer stabilization treatment described in Example 4 can be performed.

FIG. 12 shows upper limits and lower limits of the temperature where the polymer stabilization treatment (here, polymerization treatment by UV light irradiation) for obtaining the polymer/liquid crystal composite with a wide temperature range where a polymer-stabilized blue phase appears can be performed.

From the results shown in FIG. 12, it is found that when a liquid crystalline monomer including a mesogenic skeleton has an alkylene group with a certain chain length (the sum of oxygen atoms and/or carbon atoms), the temperature range where polymer stabilization treatment (here, polymerization treatment by UV light irradiation) can be performed can be extended as compared with a normal liquid crystalline monomer.

Therefore, as for the liquid crystalline monomer including a mesogenic skeleton, it is preferable that the chain length of an alkylene group (the sum of oxygen atoms and/or carbon atoms) be 20 or less for extending the temperature range where polymer stabilization treatment (here, polymerization treatment by UV light irradiation) can be performed. It is further preferable that the chain length of an alkylene group (the sum of oxygen atoms and/or carbon atoms) be 12 or less.

From the results shown in FIG. 12, in the case of using a liquid crystalline monomer in which the chain length of an alkylene group (the sum of oxygen atoms and/or carbon atoms) is an odd number, the temperature range where polymer stabilization treatment can be performed (the range between the upper limit and the lower limit) is likely to be extended. In particular, in the case of using a liquid crystalline monomer in which the chain length of an alkylene group (the sum of oxygen atoms and/or carbon atoms) is 9, the temperature range where polymer stabilization treatment can be performed can be wide as compared with the case of using a liquid crystalline monomer in which the chain length of an alkylene group (the sum of oxygen atoms and/or carbon atoms) is 6 or 10.

Specifically, in the case of using a liquid crystalline monomer in which an acryloyl group is bonded to each of ends of the mesogenic skeleton of this example, and the length of an alkylene group (the sum of oxygen atoms and/or carbon atoms) is an odd number, particularly 9, the temperature range where polymer stabilization treatment can be performed can be extended.

In general, as for a polymer-stabilized blue phase, a factor extending the blue phase appearance temperature range is that in a process of polymer stabilization treatment (polymerization treatment) of a monomer by UV light irradiation, phase separation occurs between a liquid crystal material and a polymer obtained by the polymerization, and the polymer is concentrated (polymerized) in a disclination region of the blue phase.

Therefore, from the results of this example, in the case of using a liquid crystal composition including the liquid crystalline monomer including a mesogenic skeleton of this example and the liquid crystalline monomer has an alkylene group whose chain length (the sum of oxygen atoms and/or carbon atoms) is an odd number, particularly 9, phase separation between a liquid crystal material and a polymer is performed more efficiently; thus, the treatment temperature range where polymer stabilization treatment can be performed is extended.

Figure 14A:
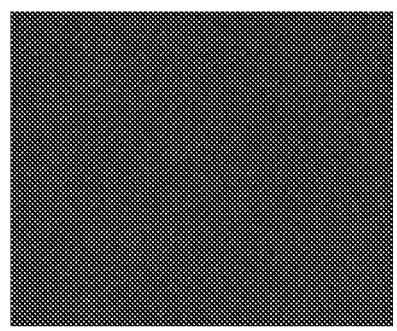
FIGS. 14A to 14D are photpgraphs of orientation states of liquid crystal elements formed in Example 4.
Figure 14B:
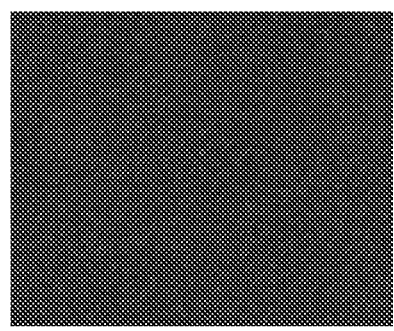
Figure 14C:
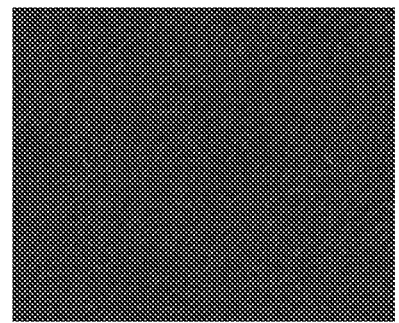
Figure 14D:
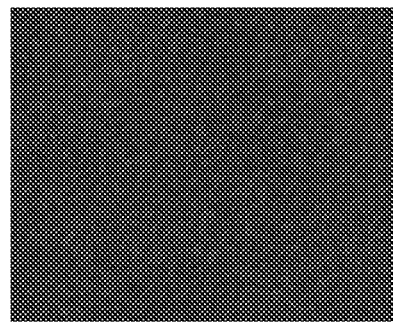

FIGS. 14A to 14D show orientation states when a polymer-stabilized blue phase appears in the case of using the liquid crystalline monomer including a mesogenic skeleton of this example. The case where the chain length of an alkylene group (the sum of oxygen atoms and/or carbon atoms) is an odd number and the case where the chain length of an alkylene group is an even number are shown. Note that FIG. 14A shows the case where the chain length of an alkylene group (the sum of oxygen atoms and/or carbon atoms) of the liquid crystalline monomer is 4, FIG. 14B shows the case where the chain length of an alkylene group is 6, FIG. 14C shows the case where the chain length of an alkylene group is 5, and FIG. 14D shows the case where the chain length of an alkylene group is 7.

According to the results, a platelet state is seen in the case where the chain length of an alkylene group (the sum of oxygen atoms and/or carbon atoms) of the liquid crystalline monomer is 4 or 6 which is an even number and the case where the chain length of an alkylene group (the sum of oxygen atoms and/or carbon atoms) of the liquid crystalline monomer is 5 or 7 which is an odd number. In the case of an odd number, it was confirmed that the size of platelet was larger.

From the results of this example, it is found that with use of the liquid crystal composition that is one embodiment of the present invention, the temperature range of polymer stabilization treatment for obtaining the polymer/liquid crystal composite with a wider blue phase appearance temperature range can be widened.

Note that as for a liquid crystal composition that can exhibit a polymer-stabilized blue phase, extension of the temperature range where polymer stabilization treatment can be performed is very effective when it is difficult to control the temperature at which UV light irradiation is performed for manufacturing a large-area liquid crystal display device or the like.

EXPLANATION OF REFERENCE

100: liquid crystalline monomer, 100a, 100b: liquid crystalline monomer, 101: mesogenic skeleton, 101a, 101b: mesogenic skeleton, 102: alkylene group, 102a, 102b: alkylene group, 103a, 103b: alkylene group, 200: first substrate, 201: second substrate, 202: liquid crystal layer, 203: pixel electrode layer, 204: common electrode layer, 301: gate wiring layer, 301a: gate electrode layer, 302: gate insulating layer, 303: semiconductor layer, 305: source wiring layer, 305a: wiring layer, 307: insulating film, 308: common electrode layer, 309: insulating film, 313: interlayer film, 320: transistor, 341: first substrate, 342: second substrate, 344: liquid crystal layer, 346: common electrode layer, 347: pixel electrode layer, 5000: housing, 5001: display portion, 5002: operation key, 5003: solar cell, 5004: charge/discharge control circuit, 5005: battery, 5006: converter (DC-DC converter), 6001: main body, 6002: housing, 6003: display portion, 6004: keyboard, 6011: main body, 6012: display portion, 6013: external interface, 6014: operation button, 6015: stylus, 6021: e-book reader, 6022: housing, 6023: housing, 6024: axis portion, 6025: display portion, 6026: display portion, 6027: power supply, 6028: operation key, 6029: speaker, 6031: housing, 6032: housing, 6033: display panel, 6034: speaker, 6035: microphone, 6036: pointing device, 6037: camera lens, 6038: external connection terminal, 6039: solar cell, 6040: external memory slot, 6041: operation key, 6051: main body, 6052: display portion (A), 6053: eyepiece portion, 6054: operation switch, 6055: display portion (B), 6056: battery, 6061: television device, 6062: housing, 6063: display portion, 6064: stand This application is based on Japanese Patent Application serial no. 2010-266530 filed with Japan Patent Office on Nov. 30, 2010, the entire contents of which are hereby incorporated by reference.

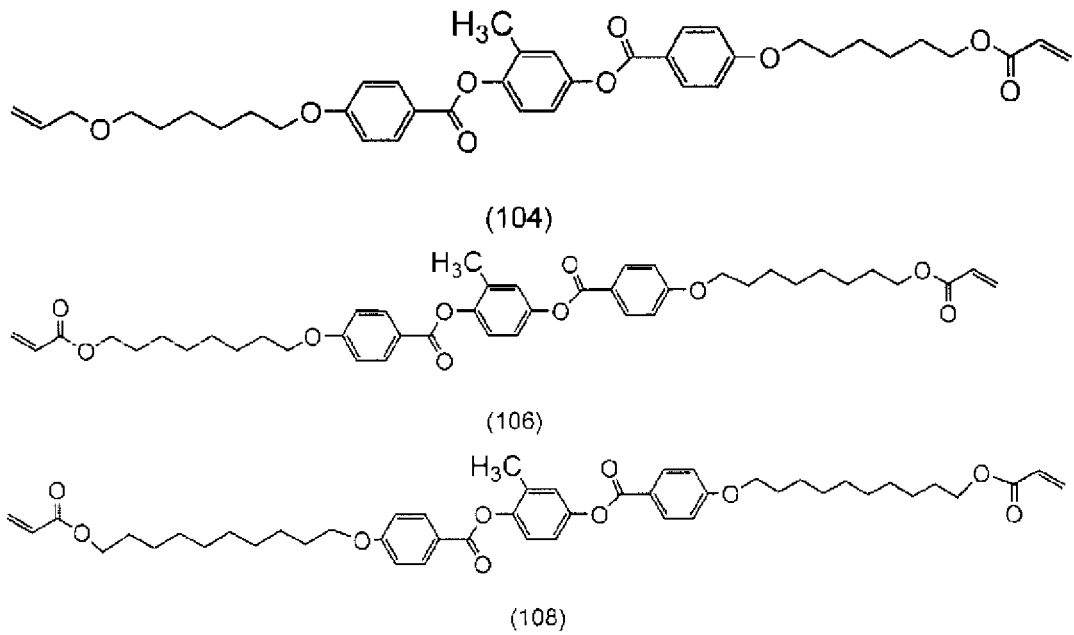

The invention claimed is:

1. A compound represented by a formula (G1-1),

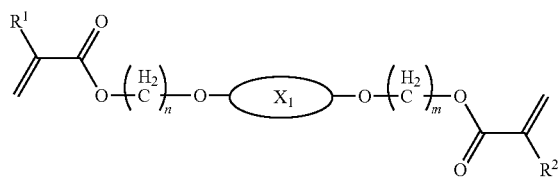
(G1-1)

wherein $X_1$ is represented by any one of formulae (s13), (s15) and (s17),

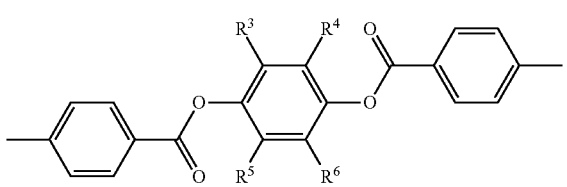
(s11)

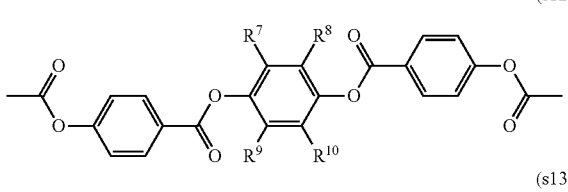
(s12)

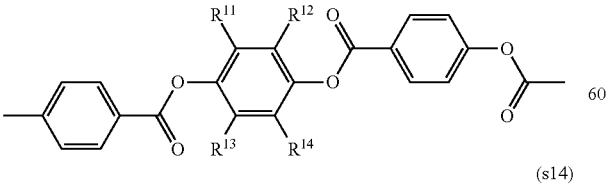
(s13)

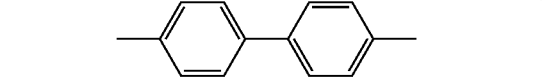
(s14)

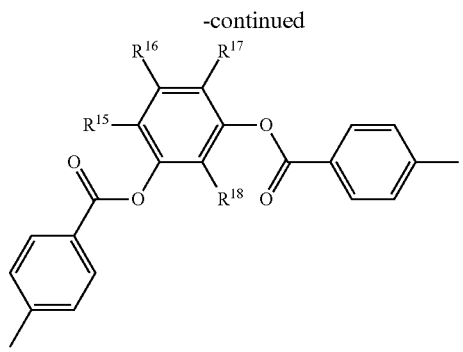
(s15)

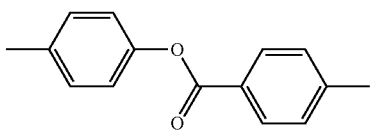
(s16)

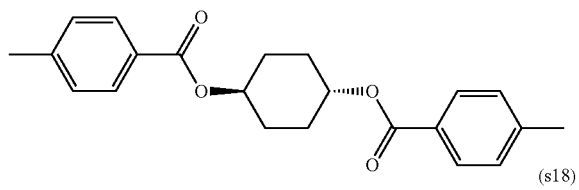
(s17)

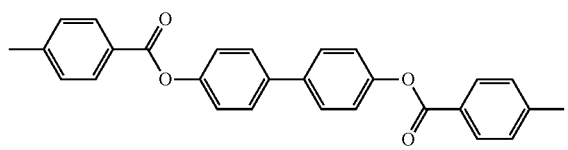
(s18)

wherein $R^1$ and $R^2$ individually represent any one of hydrogen and a methyl group and $R^3$ to $R^{18}$ individually represent any one of hydrogen, a methyl group, and fluorine, and wherein n and m are even number from 10 to 18.

2. A composition comprising the compound according to claim 1 and a material exhibiting a blue phase.

3. The composition according to claim 2, further comprising a non-liquid-crystalline monomer and a polymerization initiator.

4. A polymer/liquid crystal composite comprising a material obtained by subjecting the composition according to claim 2 to a polymer stabilization treatment.

5. A polymer/liquid crystal composite comprising a material based on the composition according to claim 2.

6. A liquid crystal element comprising the polymer/liquid crystal composite according to claim 4.

7. A liquid crystal display device comprising the liquid crystal element according to claim 6.

8. A liquid crystal element comprising the polymer/liquid crystal composite according to claim 5.

9. A liquid crystal display device comprising the liquid crystal element according to claim 8.

10. The composition according to claim 2,
wherein the material exhibiting the blue phase includes at least one of 4-(trans-4-n-propylcyclohexyl)-3',4'-difluoro-1,1'-biphenyl and 4-n-pentylbenzoic acid 4-cyano-3-fluorophenyl ester.

11. A composition comprising:
4-(trans-4-n-propylcyclohexyl)-3',4'-difluoro-1,1'-biphenyl; and
a compound represented by any one of a structural formula (102), (104), (106) and (108)

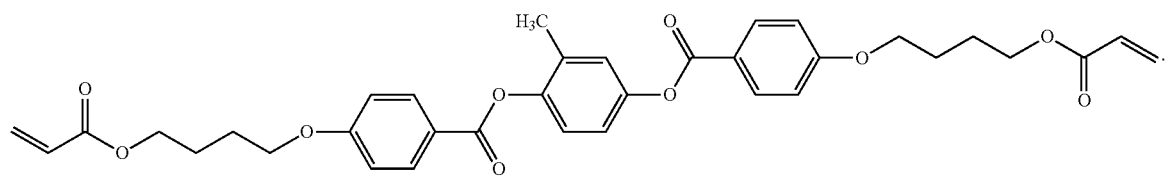

(102)

12. A composition comprising:
4-(trans-4-n-propylcyclohexyl)-3',4'-difluoro-1,1'-biphenyl; and
a compound represented by a structural formula (109),

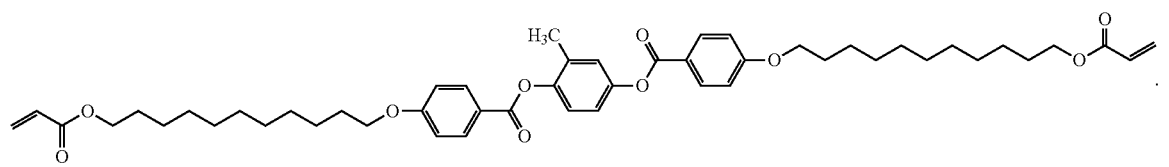

(109)

13. The composition according to claim 11, further comprising 4-n-pentylbenzoic acid 4-cyano-3-fluorophenyl ester.

14. The composition according to claim 12 further comprising 4-n-pentylbenzoic acid 4-cyano-3-fluorophenyl ester.

15. A liquid crystal element comprising a material obtained by subjecting the composition according to claim 11 to a polymer stabilization treatment.

16. A liquid crystal element comprising a material obtained by subjecting the composition according to claim 12 to a polymer stabilization treatment.

17. A liquid crystal element comprising a material based on the composition according to claim 11.

18. A liquid crystal element comprising a material based on the composition according to claim 12.

* * * * *

UNITED STATES PATENT AND TRADEMARK OFFICE
CERTIFICATE OF CORRECTION

PATENT NO. : 9,212,308 B2  
APPLICATION NO. : 13/305777  
DATED : December 15, 2015  
INVENTOR(S) : Daisuke Kubota et al.

Page 1 of 2

It is certified that error appears in the above-identified patent and that said Letters Patent is hereby corrected as shown below:

In the Specification:

Col. 38, line 24, "200 mL, recovery flask" should read --200 mL recovery flask--

Col. 38, line 27, "120 mL, of 2-butanone," should read --120 mL of 2-butanone,--

Col. 41, line 37, "(4-acryloyl oxy-n-butyl-1-oxy)" should read
--(4-acryloyloxy-n-butyl-1-oxy)--

In the Claims:

Col. 47, lines 40-55, Claim 1, delete formulae (s11) and (s12)

Col. 47, lines 63-67, Claim 1, delete formulae (s14)

Col. 48, lines 13-18, Claim 1, delete formulae (s16)

Col. 48, lines 26-33, Claim 1, delete formulae (s18)

Col. 48, line 66, Claim 11, "structural formula" should read --structural formulae--

Col. 48, line 67, Claim 11, "(106) and (108)" should read --(106), and (108)--

Signed and Sealed this  
Twelfth Day of April, 2016

Michelle K. Lee  
*Director of the United States Patent and Trademark Office*

CERTIFICATE OF CORRECTION (continued)
U.S. Pat. No. 9,212,308 B2

In the Claims, (Cont.):

Col. 49, lines 1-15, Claim 11, please add the formulae (104), (106), and (108) immediately after a formulae (102) as follows: